US012212593B2

(12) United States Patent
Voltz et al.

(10) Patent No.: US 12,212,593 B2
(45) Date of Patent: Jan. 28, 2025

(54) ACQUIRING ELECTRONIC-BASED SIGNATURES

(71) Applicant: Box, Inc., Redwood City, CA (US)

(72) Inventors: Seth Morgan Luce Voltz, San Francisco, CA (US); Jón Tómas Grétarsson, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 390 days.

(21) Appl. No.: 17/376,110

(22) Filed: Jul. 14, 2021

(65) Prior Publication Data

US 2023/0016689 A1 Jan. 19, 2023

(51) Int. Cl.
*H04L 29/06* (2006.01)
*H04L 9/32* (2006.01)
*H04L 9/40* (2022.01)

(52) U.S. Cl.
CPC ........ *H04L 63/1433* (2013.01); *H04L 9/3247* (2013.01)

(58) Field of Classification Search
CPC .......................... H04L 63/0876; H04L 63/107
See application file for complete search history.

(56) References Cited

U.S. PATENT DOCUMENTS

| | | | |
|---|---|---|---|
| 2006/0193474 A1* | 8/2006 | Fransdonk | H04L 63/061 380/279 |
| 2007/0192609 A1 | 8/2007 | Yoshioka et al. | |
| 2011/0276875 A1 | 11/2011 | Mccabe et al. | |
| 2012/0086971 A1 | 4/2012 | Bisbee et al. | |
| 2014/0007241 A1* | 1/2014 | Gula | H04L 67/10 726/25 |
| 2014/0019761 A1* | 1/2014 | Shapiro | H04L 9/3247 713/176 |
| 2014/0297629 A1 | 10/2014 | Lin | |

(Continued)

OTHER PUBLICATIONS

"Dotloop's Accept Or Counter Flow: A BetterEsign Experience," dotloop, Inc., dated May 4, 2017.

(Continued)

*Primary Examiner* — Jason K Gee
(74) *Attorney, Agent, or Firm* — Vista IP Law Group, LLP

(57) ABSTRACT

Securely acquiring and managing electronic-based signatures by a content management system. A content management system exposes content objects to a plurality of collaborators. Executable modules of the content management system implement an Internet-based interface that is configured to acquire electronic-based signatures from a user device. A particular user device is configured to access particular content objects over the Internet-based interface and to acquire an electronic-based signature corresponding to one or more of the particular content objects. When one or more conditions are detected that would at least potentially influence how the acquisition of the electronic-based signature is carried out, then one or more remediation actions are invoked. Various security-specific remediation actions address corresponding security vulnerabilities. Various document-specific remediation actions are determined based on the document conditions that had been detected. In some cases, a plurality of remediation actions are carried out to securely acquire electronic-based signatures from a user device.

20 Claims, 15 Drawing Sheets

(56) References Cited

U.S. PATENT DOCUMENTS

| | | | |
|---|---|---|---|
| 2015/0213568 A1 | 7/2015 | Follis et al. | |
| 2016/0162697 A1 | 6/2016 | Follis | |
| 2016/0314102 A1 | 10/2016 | Bezar et al. | |
| 2017/0041296 A1* | 2/2017 | Ford | G06F 21/64 |
| 2017/0220605 A1 | 8/2017 | Nivala et al. | |
| 2020/0068026 A1 | 2/2020 | Morkovine et al. | |
| 2020/0145232 A1 | 5/2020 | Haddad | |
| 2021/0191794 A1 | 6/2021 | Morkovine et al. | |
| 2022/0206644 A1* | 6/2022 | Spaetzel | G06F 21/64 |

OTHER PUBLICATIONS

"Sending and Signing with eHanko," DocuSign Support, date found via WayBack as Aug. 13, 2020.

"Allow DocuSign recipients to edit documents," date found via Google as Sep. 3, 2020.

Walker, A., "How do I edit a signed PDF document," Acrobat Library, date found via Google as Nov. 3, 2021 URL: https://answers.acrobatusers.com/How-I-edit-signed-PDF-document-q58365.aspx.

"Can I edit a PDF that I signed?," Adobe, last edited Mar. 2, 2022.

Dizon-Ngo, J., "How to edit and resend a signature request," HelloSign, dated Nov. 10, 2021.

Miller, R., "Dropbox to acquire secure document sharing startup DocSend for $165M," techcrunch.com, dated Mar. 9, 2021.

Sawers, P., "Dropbox acquires e-signature startup HelloSign for $230 million," VentureBeat.com, dated Jan. 28, 2019.

"Make your first API call in a few steps," HelloSign API, date obtained via Google as May 14, 2014, URL: https://app.hellosign.com/api/documentation.

Hueter, K., "Setting up and Using the Dropbox Integration," HelloSign, dated Jan. 20, 2022, URL: https://faq.hellosign.com/hc/en-US/articles/205830688-Setting-up-and-Using-the-Dropbox-Integration-.

Non-Final Office Action dated Nov. 8, 2023 for U.S. Appl. No. 17/706,500.

Notice of Allowance dated Apr. 10, 2024 for U.S. Appl. No. 17/706,500.

* cited by examiner

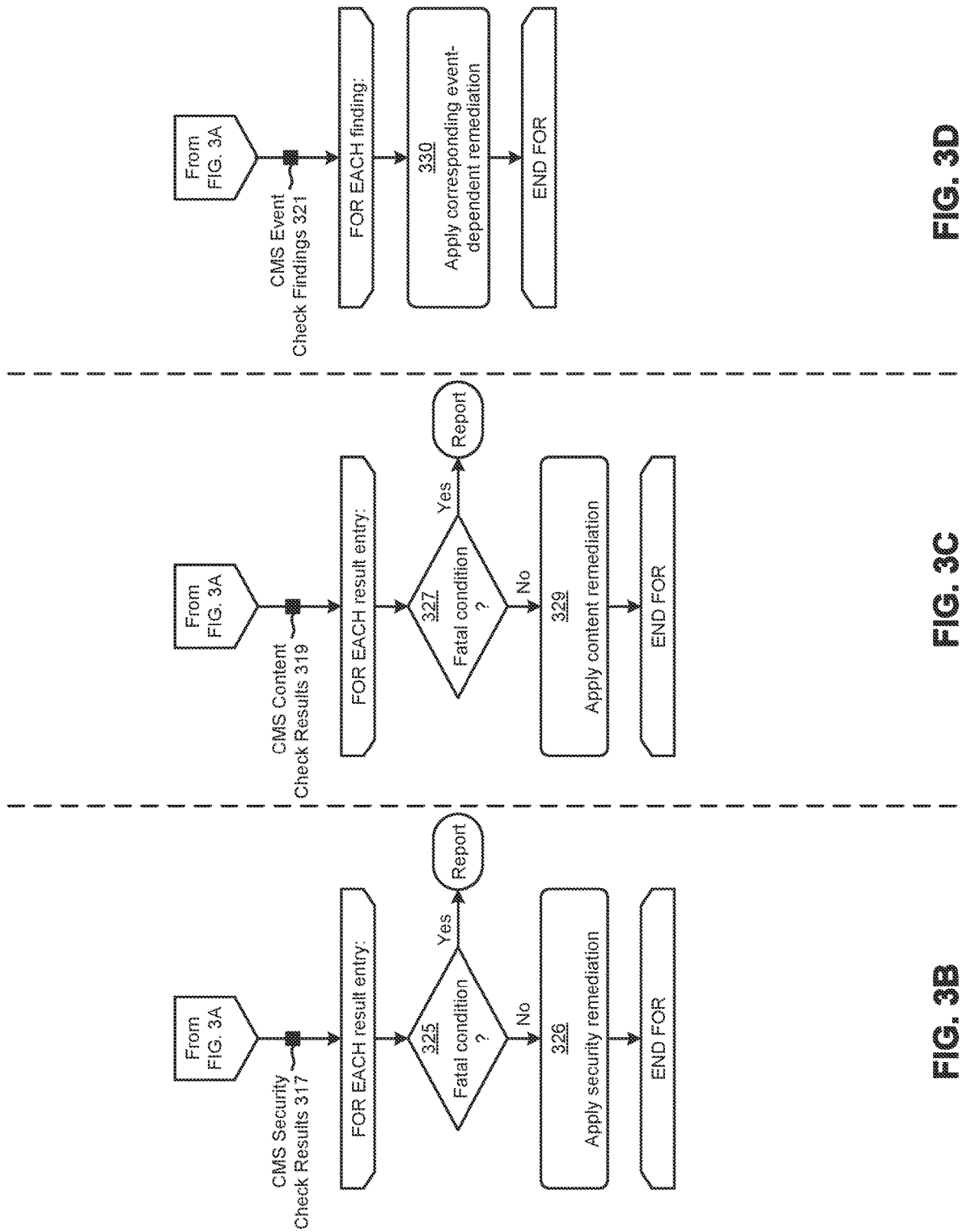

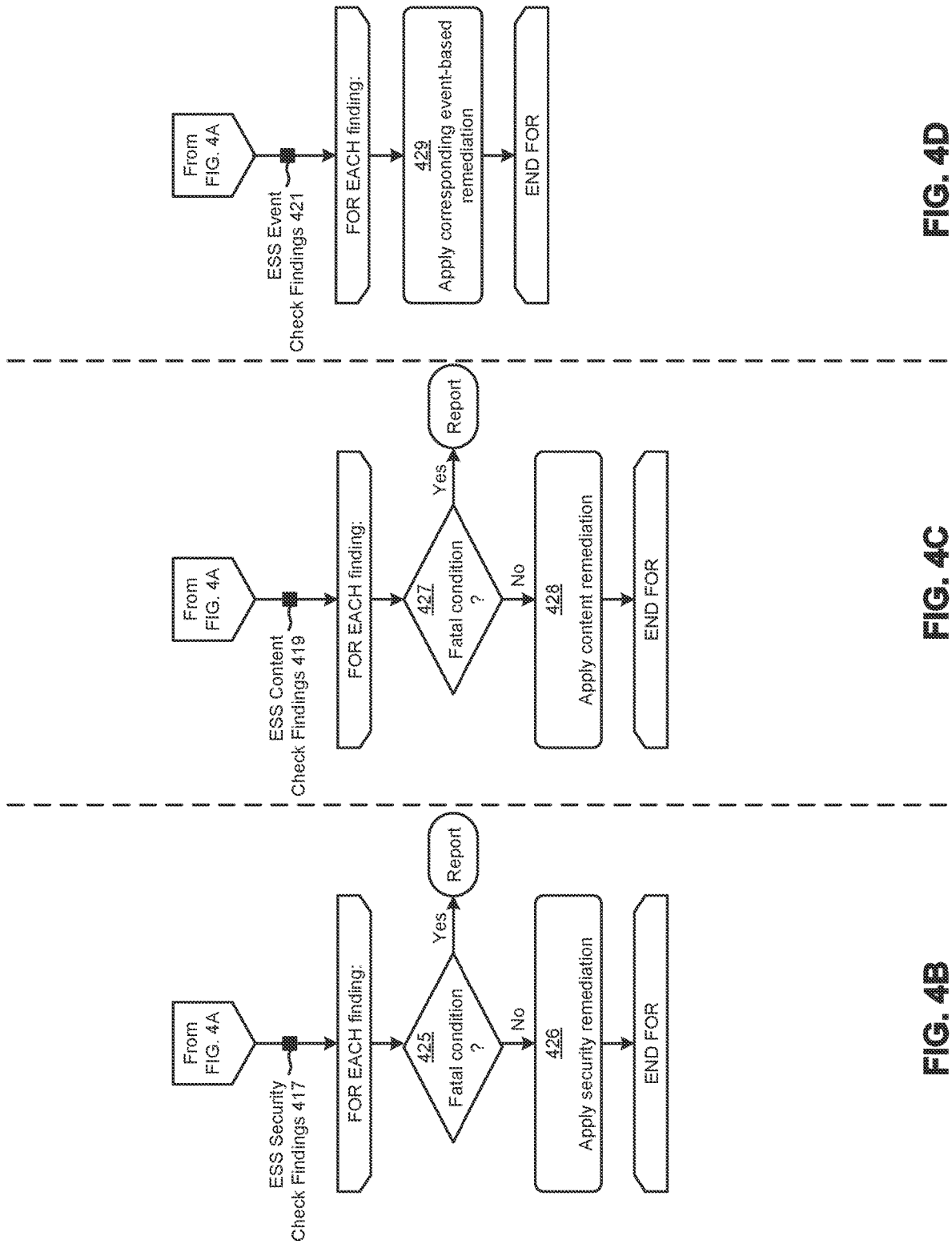

ACQUIRING ELECTRONIC-BASED SIGNATURES

TECHNICAL FIELD

This disclosure relates to document management systems, and more particularly to techniques for acquiring electronic-based signatures.

BACKGROUND

In recent time, electronic signature capabilities have emerged. Whereas, in prior times as has been practiced for many centuries, documents (e.g., contracts, financial instruments, voting ballots, etc.) have been "wet signed" by "hand and ink". More specifically, the act of placing a signature or initials on a document has required the signor to actually write, using a writing device such as a pen, onto the document in some designated location or locations. In some cases, the act of signing the document is witnessed by a third party such as a notary, or apostille provider, or a designated witness.

Carrying out the act of placing a signature or initials on a document where the signor is required to actually "wet sign", possibly in the presence of a witness, has proven to be too cumbersome in the electronic age where documents are created and retained electronically, where documents for signature are posted online, and where the signing of documents occurs at a high frequency.

Systems that afford electronic signature capabilities can be configured through application programming interfaces (APIs). In particular, once advised of the existence of a document to be signed, such application programming interfaces can be called to (1) assemble the document to be signed together with any one or more supporting electronic documents to be signed (e.g., PDFs, notarial forms, etc.), (2) designate the signatories, and (3) send the document(s) out to the signatories for their individual e-signatures. Modules of the electronic signature system can be configured to (4) collect e-signatures as they occur, and (5) advise all signatories that the document has been signed by all parties.

In some cases, application programming interfaces work in conjunction with computerized modules of an e-signature systems. As such, by using such programming interfaces, various computerized modules can respond to a selection of documents (e.g., through a GUI picker), respond to user-selected options (e.g., via processing pulldown menus, radio buttons, etc.).

Unfortunately, the definitions of such APIs are limited to only specific operations and information exchanges. As such, legacy implementations of electronic signature systems operate at "arm's length" and are thus unable to access information that might be useful in acquiring an electronic signature. Moreover, legacy implementations of electronic signature systems fail to address security considerations that might relate to network locations in the signing ecosystem.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for securely acquiring e-signatures, which techniques advance the relevant technologies to address technological issues with legacy approaches. More specifically, the present disclosure describes techniques used in systems, methods, and in computer program products for determining security vulnerabilities and performing remediation when processing documents for e-signature.

The disclosed embodiments modify and improve over legacy approaches. In particular, the herein-disclosed techniques provide technical solutions that address the technical problems attendant to integrations between an e-signature system and a content management system. Such technical solutions involve specific implementations (i.e., data organization, data communication paths, module-to-module interrelationships, etc.) that relate to the software arts for improving computer functionality.

Many of the herein-disclosed embodiments implement technological solutions pertaining to technological problems that arise in the hardware and software arts that underlie enterprise-level content management systems, e-signature systems, and integrations therebetween. Aspects of the present disclosure achieve performance and other improvements in peripheral technical fields including, but not limited to, electronic signature system architectures and data loss protection.

Some embodiments include a sequence of instructions that are stored on a non-transitory computer readable medium. Such a sequence of instructions, when stored in memory and executed by one or more processors, causes the one or more processors to perform a set of acts for remediating operational vulnerabilities during e-signature acquisition.

Some embodiments include the aforementioned sequence of instructions that are stored in a memory, which memory is interfaced to one or more processors such that the one or more processors can execute the sequence of instructions to cause the one or more processors to implement acts for remediating operational vulnerabilities during e-signature acquisition.

In various embodiments, any combinations of any of the above can be organized to perform any variation of acts for determining security vulnerabilities and performing remediation when processing documents for e-signature, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 3B through FIG. 3E depict example remediation techniques as employed by a content management system, according to an embodiment.

FIG. 4B through FIG. 4E depict example remediation techniques as employed by an e-signature system, according to an embodiment.

DETAILED DESCRIPTION

Figure 1A:
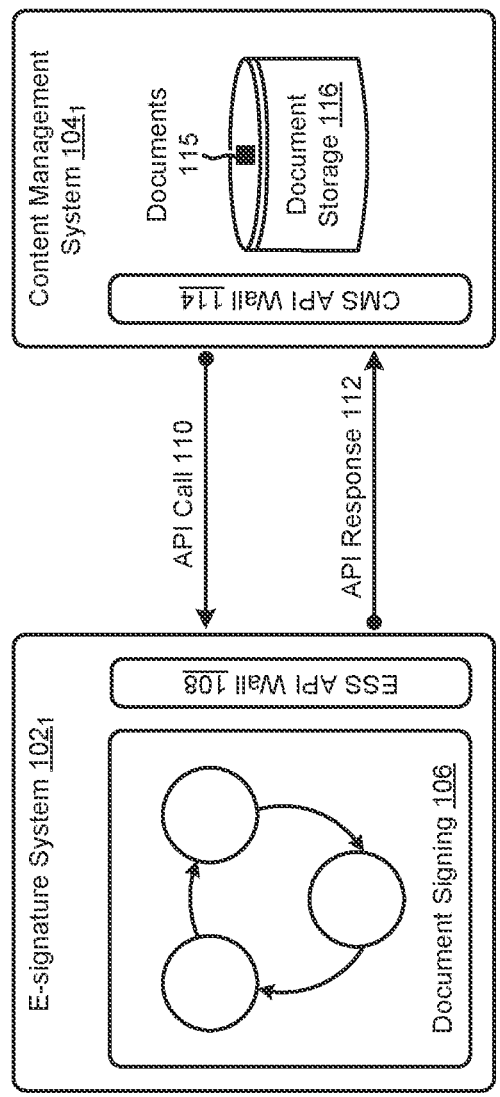
FIG. 1A exemplifies an API-based architecture.

Aspects of the present disclosure solve problems associated with using computer systems for identification of operational vulnerabilities during e-signature acquisition. Some embodiments are directed to approaches for remediating operational vulnerabilities during e-signature acquisition. The accompanying figures and discussions herein present example environments, systems, methods, and computer program products for determining security vulnerabilities and performing remediation when processing documents for e-signature.

Overview

A modern content collaboration and management system is able to keep track of documents, while at the same time, being able to keep track of who (e.g., which users/collaborators) have access to the documents, when such documents have been accessed by whom, as well as how such documents and/or its metadata have been modified over time. In some cases, modern content management systems are able to keep track of ongoing automated processing (e.g., via workflows) over documents. In still further cases, modern content management systems are able to keep track of specific activities (e.g., authorizations) over specific document types (e.g., contracts). What is needed is for content management systems to automatically invoke actions to be carried out, in whole or in part, by an e-sign system. Further, what is needed are e-sign systems that are able to automatically invoke actions to be carried out, in whole or in part by a content management system.

In various embodiments, such as are disclosed herein, bilateral sharing of information between a content management system and an e-sign system offers the opportunity to identify risks and vulnerabilities so as to permit either the content management systems or the e-sign system to remediate the risks and/or potential vulnerabilities before the e-signers and/or the documents themselves are subjected to an actual vulnerability.

Strictly as an example, a content management system might not know that a particular signatory to a document is signing through an IP hop that is located in a rogue nation, however the e-sign system can know this fact and cause the content management system to remediate the risk (e.g., by hardening the protection around the document, or by disallowing the e-signature over that network path). As another example, actions taken at or by an e-sign system might introduce personally identifiable information (PII) into a document to be signed. A corresponding content management system might be able remediate the risk of dissemination to other signatories by, for instance, blurring out the PII before others can see (and possibly misappropriate) the PII.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

Figure 1B:
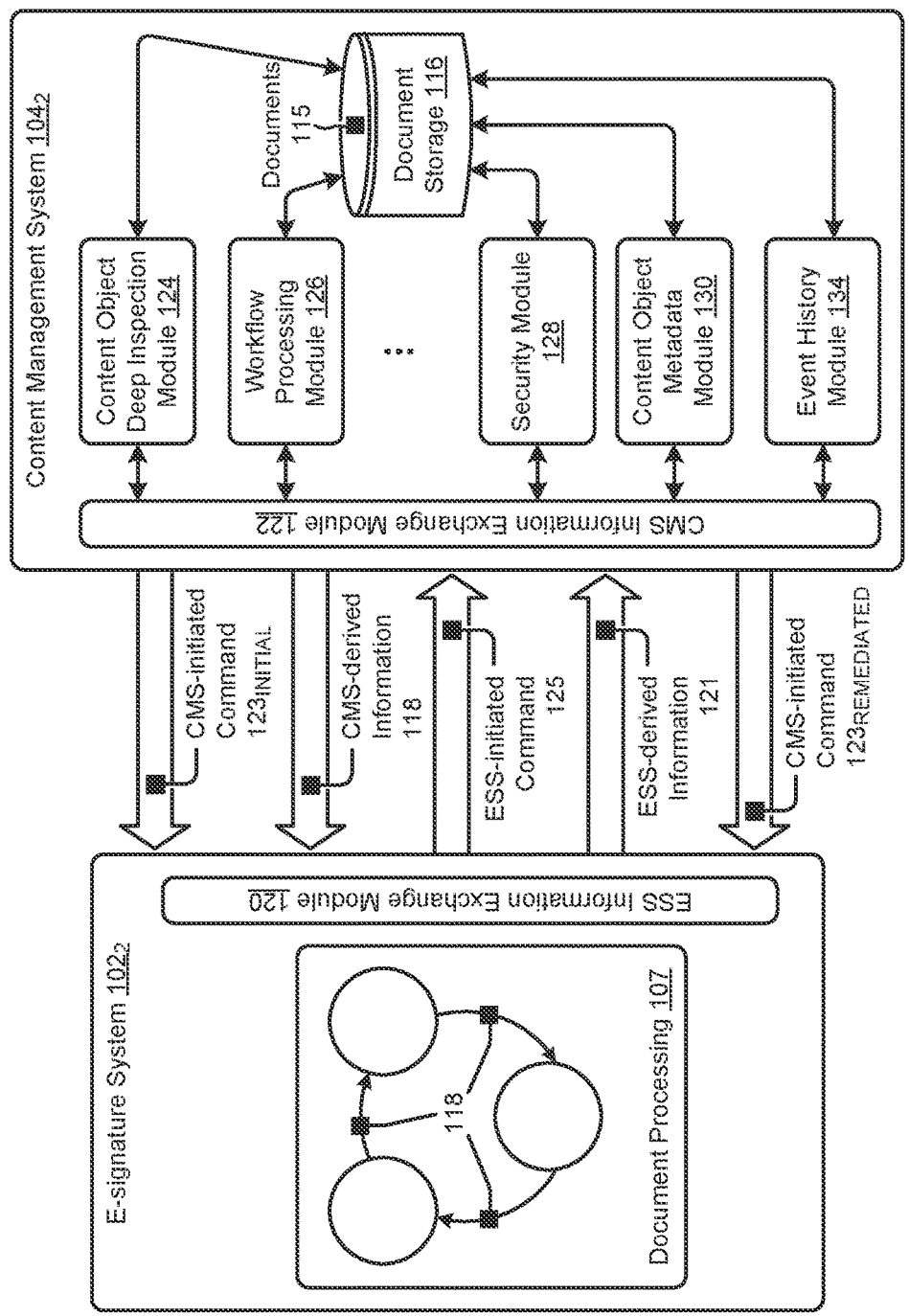
FIG. 1B exemplifies a bidirectional data-enriching architecture, according to an embodiment.
Figure 1C:
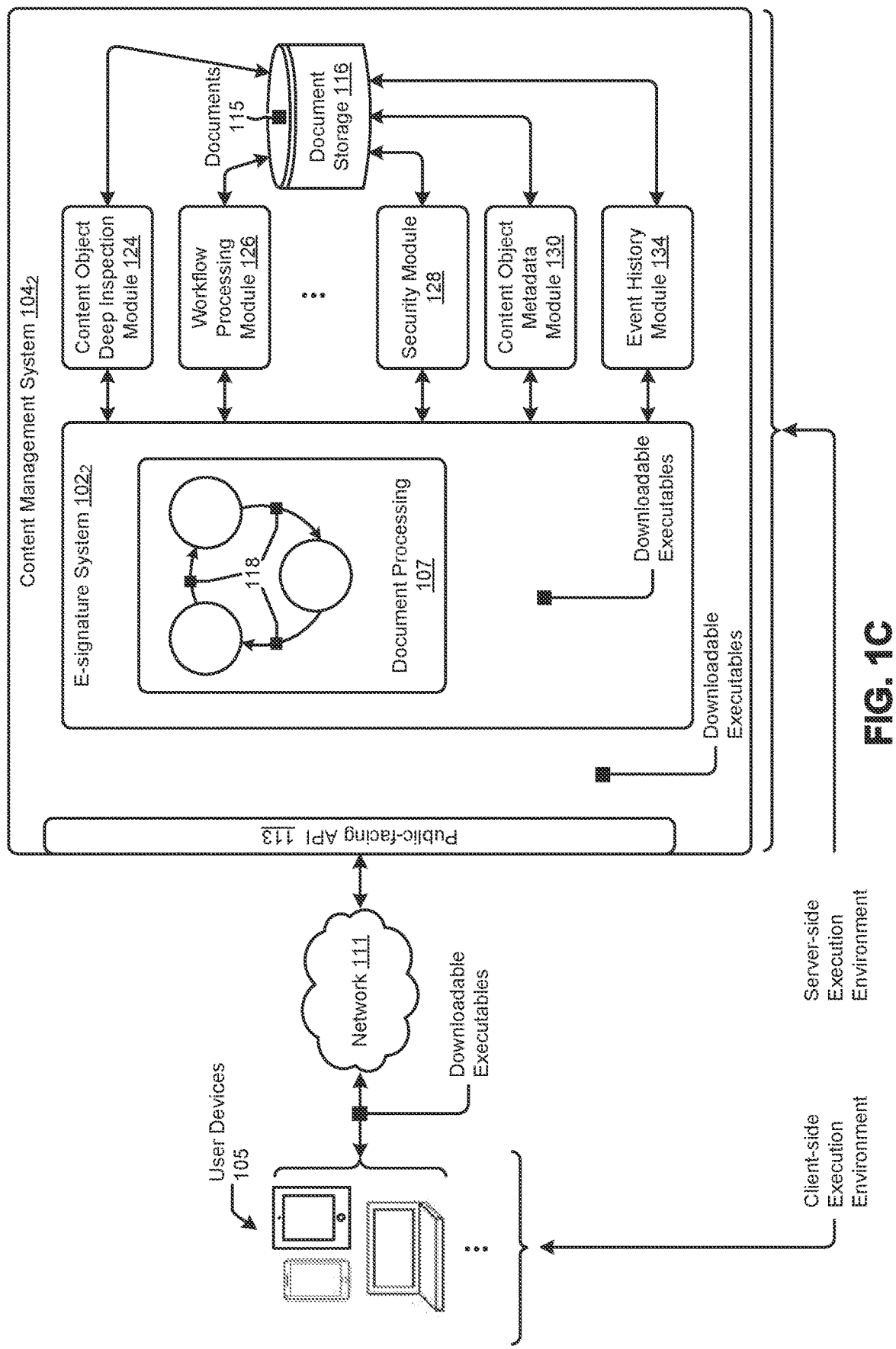
FIG. 1C exemplifies a unified bidirectional data-enriching architecture, according to an embodiment.

FIG. 1A exemplifies an API-based architecture, whereas FIG. 1B and FIG. 1C exemplify bidirectional data-enriching architectures. As an option, one or more variations the architectures or any aspect thereof may be implemented in the context of the architecture and functionality of the embodiments described herein and/or in any environment.

Figures FIG. 1A, FIG. 1B, and FIG. 1C are being presented in succession to illustrate some of the differences between architectures. More particularly, figures are being presented in succession to illustrate how bidirectional data-enriching operations can be carried out in the architectures and interfacing topologies of FIG. 1B and FIG. 1C, whereas the architecture of FIG. 1A supports no such bidirectional data-enriching operations. This is illustrated, for example, by comparing the inner workings of content management system $104_1$ (i.e., a CMS) as compared with the inner workings of content management system $104_2$. Specifically, in content management system $104_1$, documents 115 in document storage 116 are behind an API wall such as the shown CMS API wall 114, whereas the inner workings of content management system $104_2$ show a fully-featured instance of CMS information exchange module 122. In an architecture such as is shown in FIG. 1A, the content management system $104_1$ interacts with e-signature system by making an API call 110 to the e-signature system 1021 and receiving an API response 112. An API call and a corresponding API response may have to go through an e-signature system API wall (e.g., the shown ESS API wall 108) before the e-signature system 1021 can initiate document signing 106. As such, in this architecture, only those functions that are raised by the CMS (e.g., via an API call) can be facilitated by the ESS.

Although the architecture of FIG. 1A is deficient as heretofore discussed, an architecture that facilitates bidirectional information exchange and/or an architecture that facilitates raising events from either the CMS or from the ESS overcomes the foregoing deficiencies. One architecture that supports both bidirectional information exchange and that supports the raising of events from either the CMS or from the ESS is shown in FIG. 1B. Specifically, and as shown, content management system $104_2$ interfaces with e-signature system $102_2$ over the shown CMS information exchange module 122, which in turn interfaces with the shown ESS information exchange module 120. The implementation of such information exchange modules facilitates forms of document processing 107 that take into account a rich set of information that is available in a CMS. In the other direction, implementation of such information exchange modules facilitates forms of document processing within the CMS that would not be possible in the absence of bidirectional information exchange between the CMS and the ESS.

Strictly as an example scenario, there may be security vulnerabilities that are discovered during the course of signing a document, which security vulnerabilities or other risks that might be remediated in conjunction with the CMS by hardening the security protection around the document, and/or by deferring the e-signing event to a later time, such as when the document hardening has been accomplished. In the example architecture of FIG. 1B, the foregoing scenario might emerge as follows: (1) The content management system $104_2$ raises a request to the e-signature system $102_2$ (e.g., via CMS-initiated command $123_{INITIAL}$), which may be accompanied or followed by CMS-derived information 118; (2) the e-signature system $102_2$ performs document processing 107 using the CMS-derived information 118 and, during the course of such document processing, the e-signature system $102_2$ determines that the content management system $104_2$ needs to be apprised of one or more aspects of ESS-derived information 121; (3) the e-signature system $102_2$ raises an ESS-initiated command 125 to the CMS; (4) the CMS performs remediation and/or instructs the ESS to perform remediation; and (5) the content management system $104_2$ raises a new request to the e-signature system $102_2$ via CMS-initiated command $123_{REMEDIATED}$.

In further detail, (1) the content management system $104_2$ raises a command (e.g., a CMS-initiated command $123_{INITIAL}$) to sign a document that has been deemed to be ready for signing; (2) the e-signature system $102_2$ performs document processing 107 using CMS-derived information 118 and, during the course of such document processing, the e-signature system $102_2$ determines that the network over which the document is being signed includes an IP hop that is insecure (e.g., at an Internet cafe); (3) the e-signature system $102_2$ raises an ESS-initiated command 125 to the CMS to advise the CMS of the security vulnerability; (4) based on the specific vulnerability, the CMS performs remediation such as by encrypting the document and requiring a multi-factor authentication; and (5) the content management system $104_2$ raises a new request to the e-signature system $102_2$ via CMS-initiated command $123_{REMEDIATED}$ so as to cause the e-signature system $102_2$ to acquire the needed signature after authentication.

Strictly as one example, an ESS-initiated command 125 might be a request for the CMS to gather some specific information, and/or to allow or deny some proposed action that is a candidate-proposed action to be taken by the ESS only upon allowance provided by the CMS.

The foregoing is merely one illustrative scenario. Many other scenarios cover many other situations, including many other situations where a security vulnerability is detected and indicated by the ESS and then remediated by the CMS as well as other situations where a security vulnerability is detected and indicated by the CMS and then remediated by the ESS.

As used herein, a security vulnerability refers to any situation where one or more aspects of an network connection (including edge connections to a user device) and/or one or more aspects of a content object or its corresponding metadata or workflows, and/or one or more aspects of a policy with respect to the network connection or the content object would present a barrier to achievement of at least one of, a privacy requirement, an authentication requirement, or a governance requirement. Identification and remediation of any given security vulnerability can be facilitated when there exists a tightly-coupled information exchange between modules of a CMS and modules of an ESS.

Specifically, and referring again to the bidirectional information exchange as exemplified by FIG. 1B and by FIG. 1C, a CMS can be configured with any number of modules that can carry out specific types of processing, the results of which processing can be used to enrich the exchange of information between modules of a CMS and modules of an ESS. The specific embodiment of FIG. 1B includes a content object deep inspection module 124, a workflow processing module 126, a security module 128, a content object metadata module 130, an event history module 134, as well as other modules. Any/all of the foregoing modules can store/retrieve to/from content object storage. Moreover, any of the foregoing modules of the CMS can be configured to communicate with any other module of the CMS. As one illustrative example, workflow processing module 126 might determine that a contract is ready for multi-party signing. In preparation for carrying out a next step in the workflow, the workflow module might interrogate the content object metadata module to determine if the contract is associated with any particular handling requirements. The content object metadata module might in turn interrogate the security module to determine specifics as for handling the contract within the bounds of, for example, a pre-established security regime.

FIG. 1C exemplifies a unified bidirectional data-enriching architecture. In this architecture, the shown e-signature system $102_2$ is composed of executables that are situated within content management system $104_2$. As such, e-signature system $102_2$ can interface directly with any of the modules (e.g., content object deep inspection module 124, workflow processing module 126, security module 128, content object metadata module 130, event history module 134) of the content management system. In some cases, e-signature system $102_2$ can have direct access to documents 115 of document storage 116.

User devices 105 interact with the e-signature system over/through network 111. In some embodiments, e-signature system $102_2$ hosts downloadable executables that can be retrieved from any of a variety of user devices (e.g., smart phones, tablets, laptops, such as are shown). The user devices execute portions of the downloadable executables so as to interact with the content management system and/or the e-signature system. In some cases, the user devices execute the downloadable executables so as to interact with the content management system and/or the e-signature system via a public-facing API 113. The public-facing API can access any module of the CMS and/or any document 115 of the CMS. Furthermore, the e-signature system and/or the content management system $104_2$ can host additional executable modules that implement at least a portion of the Internet-based interface. For example, the e-signature system and/or the content management system $104_2$ can host additional executable modules that are downloadable to a user device. As such, once applicable executable modules have been downloadable to a user device, the user device can perform any functions or interactions of the ESS or CMS that are codified in the downloadable executable modules.

Any combination of interactions between the user devices and the content management system, and/or between the user devices and the e-signature system, and/or any interactions between any of the constituent modules of the CMS may be carried out in any order. Moreover, any combination of interactions between modules of the CMS and modules of the ESS may be carried out in any order. To accommodate flexible multi-module data gathering and processing by and between modules of a CMS and/or by and between a CMS and an ESS, an event-driven system may be implemented. An event-driven system, including multi-module data gathering for securely acquiring e-signatures is shown and described as pertains to FIG. 2A and FIG. 2B.

Figure 2A:
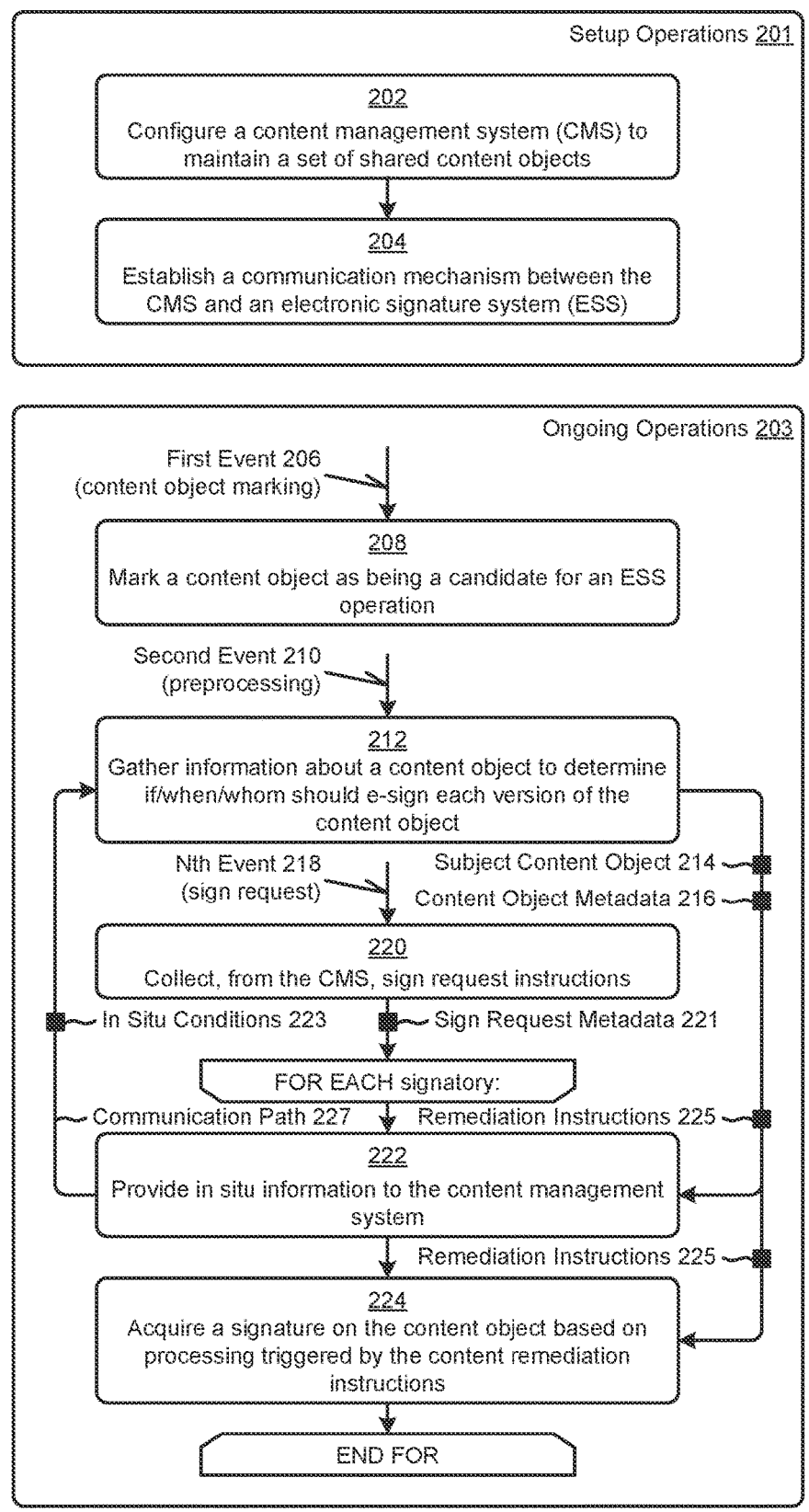
FIG. 2A presents a multi-module data gathering technique as used for securely acquiring e-signatures, according to an embodiment.

FIG. 2A presents a multi-module data gathering technique 2A00 as used for securely acquiring e-signatures. As an option, one or more variations of multi-module data gathering technique 2A00 or any aspect thereof may be implemented in the context of the architecture and functionality of the embodiments described herein and/or in any environment.

The figure is being presented to illustrate how a multi-module data gathering technique can be implemented by performing a particular set of setup operations 201, followed by ongoing operations 203 that implement event driven data gathering at or by or between the ESS and the CMS. The data gathered informs how each signature from each signatory is to be acquired.

In the shown embodiment, setup operations 201 includes step 202 to establish a CMS for maintaining a set of shared content objects. As discussed herein, the shared content objects might include deals, contracts, financial instruments, voting ballots, codicils, etc., any of which can be executed, attested to, authorized, etc. by an e-signature as applied electronically by an authenticated signatory. Such a CMS may include any/all of the modules as discussed pertaining to FIG. 1B. Moreover, the CMS may be purposely interfaced to multiple e-signature systems (e.g., to accommodate different e-signature systems that have been pre-selected and/or pre-vetted for use in particular jurisdictions). As such, step 204 serves to establish a communication mechanism (e.g., a protocol, a specific set of mutually-agreed APIs, etc.) between the CMS and one or more e-signature systems. Once the setup operations have commenced, the ongoing operations can be enabled for processing events as they are raised.

Different events or different types of events or different timing of events (e.g., first event 206, second event 210, Nth event 218) can occur in any order. In the example if FIG. 2A, a first event 206 triggers step 208 to mark a content object as a candidate for signing. A content object that is known (e.g., by the CMS) to be, for instance, a sales agreement might be marked as a candidate for signing. Additionally or alternatively, a sales agreement might be marked as a candidate for signing if/when the sales agreement becomes available (e.g., is entered into a deal), or if/when the sales agreement is deemed (e.g., by a workflow, by a dollar amount threshold, etc.) to be in a condition for signing.

For the purpose of marking a content object as a candidate for an ESS operation, the candidate content need not necessarily be ready for signing. In fact, it can happen that a candidate content might never meet the conditions necessary for subjecting the content for signatures. For example, this can occur when a deal that is nearly concluded is superseded by, for example, a different/larger deal. As another example, it can happen that at a certain moment in time, not all of the email aliases for all of the signatories of a document have been verified and, as such, that document, even though it is a candidate for sending out for e-signatures, is not ready at that particular moment in time.

At any moment in time, a candidate document might be deemed to be ready for preprocessing prior to sending the content object out for e-signatures. As such, a preprocessing event (e.g., second event 210) might be raised by either the CMS or the ESS. One possible response to a preprocessing event is to gather then-current information (step 212) that pertains to a particular content object that is to be sent out for e-signatures. Such then-current information might relate to e-signature parameter values that are determined from, or by or between the CMS and the ESS. Strictly as examples, such e-signature parameter values might correspond to (1) an enterprise ID, such as the enterprise that is one of the juristic entity signatories; (2) a list of signatories; (3) a signatory's formal name and/or a preferred signature style; (4) a set of security requirements that may apply to a particular one or more of the signatories (e.g., multi-factor authentication requirements, etc.); (5) e-signature parameter values pertaining to user standing or user profile standing (e.g., type of user, applicable authentication methods, enterprise affiliation, verification of affiliated enterprise, assigned SSO provider for the affiliated enterprise, etc.) in the CMS, etc., and (6) e-signature parameter values referring to requirements for a digital witness and/or digital notarization or digital apostille.

With respect to e-signature parameter values pertaining to requirements for a digital witness and/or digital notarization or digital apostille, certain of such requirements might be satisfied by obtaining a then-current photo of a signatory's government-issued identification instrument (e.g., passport, driver license, etc.). Additionally or alternatively, and with respect to requirements for a digital witness and/or digital notarization or digital apostille, such requirement might be addressed by capturing a then-current video of the natural person in the act of e-signing. Such a video can be verified via metadata in the video file itself. In some cases, the contents of the video file itself can be forensically analyzed to ensure the video is not a fake (e.g., a "deep fake"). Such forensic analysis can be performed by the CMS or by a third-party as may be designated by the ESS or by the CMS. More specifically, the ESS may raise an event at the CMS, and/or call an API hosted by the CMS, and/or otherwise interact with the CMS to initiate such forensic analysis.

Any/all of the foregoing e-signature parameter values in any order or combination can be used to form a data structure or message (e.g., an envelope data structure or envelope message) that characterizes who (e.g., via a list of signatory's email aliases), what (e.g., via identification of a subject content object 214), and how (e.g., based on content object metadata 216) the document is to be signed. The data structure or message might further characterize what post-signing actions are to be carried out and/or how the document is to be treated once all signatories have signed. The then-current information (e.g., as gathered in step 212) is made available to downstream processing.

At some moment in time a sign request (e.g., Nth event 218) might be raised. Such a sign request may be raised asynchronously by any module of the CMS or any module of the ESS. In the specific example of FIG. 2A, an occurrence of a sign request invokes step 220 to collect sign request instructions, which instructions are processed so as to normalize, format, and/or otherwise prepare and organize the sign request instructions in a manner that comports with the particular ESS to be used. In some cases, a different ESS is used for different signatories. As such, step 220 may collect, normalize, format, and/or otherwise prepare information specifically to comport with each ESS.

In some cases, the processing of step 212 and/or step 220 serve to characterize what post-signing actions are to be carried out and/or how the document is to be treated once all signatories have signed. Such characterizations, including specific post-signing instructions, can be captured as sign request metadata (e.g., the shown sign request metadata 221), which sign request metadata can be delivered in whole or in part to the ESS, and/or which sign request metadata can be retained in whole or in part by the CMS. In many situations, there are actions that are to be carried out by the CMS either after each signature has been acquired, and/or after a particular signature from a particular signatory has been acquired, and/or after all signatures, notarizations, apostilles, etc. have been acquired.

Processing to acquire the individual signatures as codified in a given sign request envelope are carried out by the ESS. Such processing may include a great deal of processing that is carried out even in advance of acquiring the particular signature. In some cases, processing (e.g., step 222) is carried out in advance of acquiring the particular signature. The processing of step 222 might gather in situ conditions as pertains to a particular signatory and his/her environment. In some cases, the processing of step 222, the analysis of local in situ conditions, might cause the ESS to communicate all or portions of any concerning in situ conditions 223 to the CMS (e.g. via communication path 227). The CMS might, in response to receipt and consideration of the concerning in situ conditions, provide remediation instructions 225, which remediation instructions might cause step 222 to be re-invoked so as to remediate at the ESS and/or to provide additional in situ information back to the CMS.

The foregoing communication path 227 might comprise an information exchange that is carried out by and between the ESS and the CMS. In some cases, such an exchange involves one or more protocols (e.g., an Internet protocol, an API-defined protocol, a webapp-defined protocol, etc.). The CMS can respond, for example, by carrying out the processing of step 212 in consideration of the in situ conditions 223 that are provided by the ESS. In some cases, remediation instructions are emitted by the CMS when carrying out the processing of step 212. In some cases the carrying out of the processing of step 212 is in response to receipt of the information received over communication path 227.

Additionally or alternatively, the CMS might, of its own accord, provide remediation instructions 225 to the EMS, where the remediation instructions are formed in response to changes that have occurred within the CMS system. For example, if a security level on a document were increased, then the CMS might send remediation instructions that include the semantics of "only use 'https' for Internet communications". The CMS might also send content object metadata 216 as an indication of the increased security level.

Based on the gathered in situ conditions and/or based on the carrying-out of any remediation instructions, step 224 is carried out to acquire an e-signature.

Figure 2B:
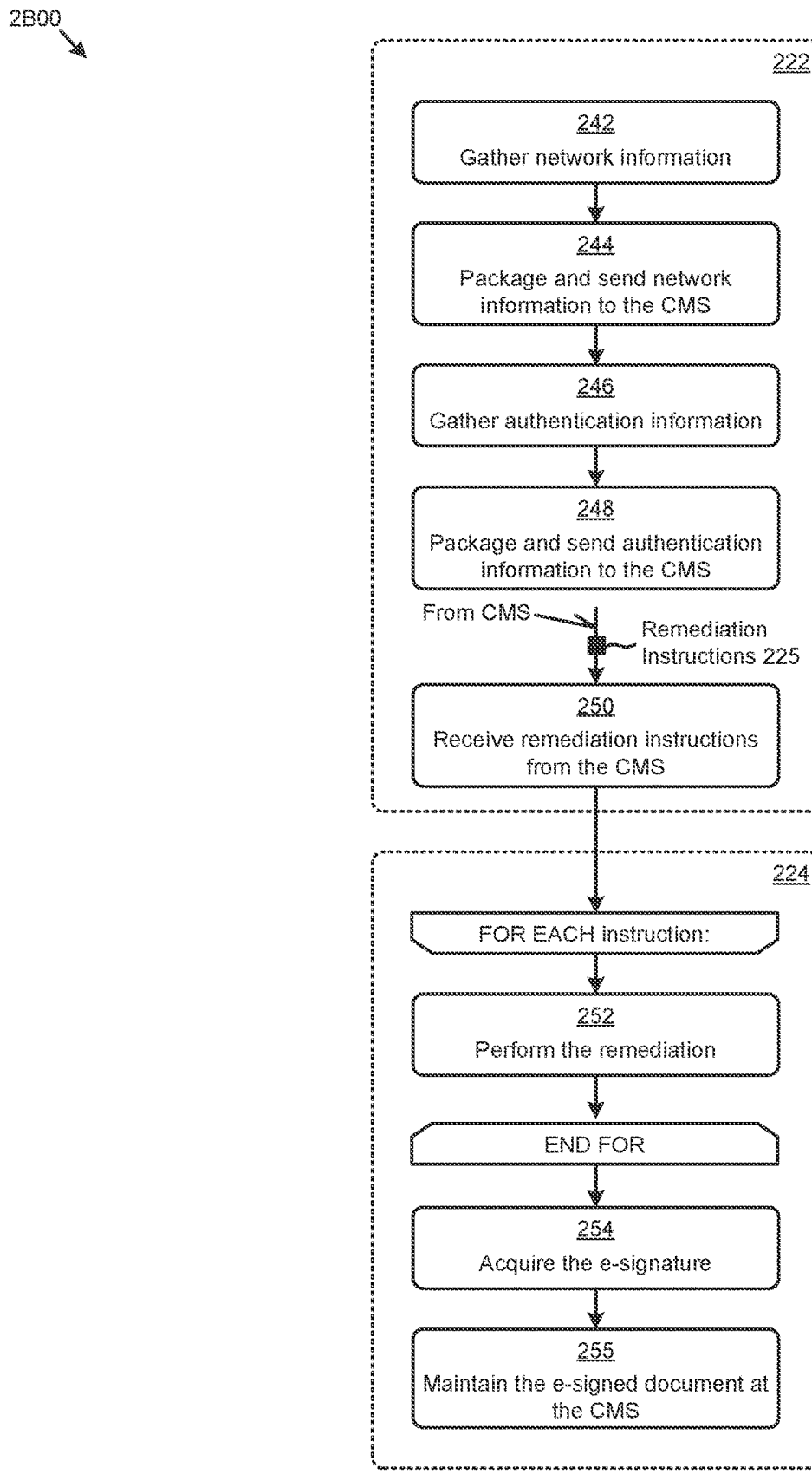
FIG. 2B presents an in situ data gathering and vulnerability remediation technique as used for securely acquiring e-signatures, according to an embodiment.

FIG. 2B presents an in situ data gathering and vulnerability remediation technique 2B00 as used for securely acquiring e-signatures. As an option, one or more variations of in situ data gathering and vulnerability remediation technique 2B00 or any aspect thereof may be implemented in the context of the architecture and functionality of the embodiments described herein and/or in any environment.

The figure is being presented to illustrate how in situ conditions might be implemented. More specifically, the figure is being presented to illustrate how network and authentication information as gathered by the ESS might be packaged and sent to the CMS for possible remediation. It should be recognized that in a modern mobile-device world, the ability for a user device to move from one network environment to another network environment can introduce the possibility of new or changing vulnerabilities. As such, the network conditions at the time and location of prospective signing need to be checked against some set of security policies. Such security policies are often maintained by the CMS. In many cases, such security policies change dynamically on a moment-by-moment basis.

Still further, a broad range of suspect in situ network conditions and a broad range of suspect signatory authentications can be remediated by and between the ESS and the CMS. Specifically, and strictly as an example, if it happens that an access device that a signatory is using has not yet been authorized by the CMS, and/or if it happens that an access device that a signatory is using has been de-authorized by the CMS, then in advance of accepting an e-signature, the ESS and CMS will negotiate a remediation. Continuing this example, and in the event of a new, not yet authorized device, the ESS and CMS may agree to carry out some authentication protocol using a multi-factor authentication involving a device that is already known to the CMS to be an authorized device.

In some situations, a signatory might be logged in to the ESS and/or CMS using an identity (e.g., username/password pair, authentication certificate, etc.) that is different from the signatory given in the envelope. In this situation, the ESS might not, by itself, be able to remediate (e.g., reconcile the identities of the two users) the apparent difference. However, the ESS can at least hypothesize that the user and/or device that is being used to e-sign must be one of the signatories on the envelope. As such, the ESS can gather relevant in situ conditions and revert back to the CMS (e.g., over communication path 227), and the CMS can in turn reconcile the apparent difference. To illustrate, it might happen that a single individual natural person might have two accounts at the CMS, and that the email delivery address corresponding to a first one of the two accounts appears on the envelope. When the sign request was delivered to the email delivery address corresponding to the first one of the two accounts, and in the event that the ESS is unable to authenticate the user, then the ESS can ask the CMS to remediate. Remediation might be accomplished by the CMS confirming the natural person's identity of the signatory through use of multi-factor authentication.

Situations and/or environments such as might occur in the foregoing examples can be addressed by the shown flow. Specifically, step 242 serves to gather network information which is then sent via step 244 to the CMS. The CMS processes the network information, possibly to determine if the then-current network is on a known blacklist, and/or if the then-current network path includes hops involving suspicious locations, etc. Additionally, step 246 serves to gather authentication information which is then sent via step 248 to the CMS. The CMS processes the network authentication, possibly to determine if the then-current authentication is of sufficient strength relative to the risks or vulnerabilities known to be attached to the then-current network path and/or location.

The CMS in turn processes the packaged network and authentication information, and responds with remediation instructions 225 that are received (step 250) by the ESS. Once the remediation instructions are received by the ESS, then at step 224, each individual remediation instruction is performed by the ESS (step 252) and, assuming success in carrying out the remediation, the sough-after signature is acquired. In some cases, the then-current conditions are such that the CMS deems that there is no remediation needed. As such, the remediation instructions might be merely to acquire the e-signature (step 254) so long as the network conditions had not changed since providing the network conditions to the CMS.

Once the e-signature has been acquired, acquisition of such an e-signature can be designated as pertains to the specific subject document. More specifically, once the e-signature has been acquired, the acquisition of such an e-signature can be designated (e.g., as a visible signature) directly in the subject document, and/or the acquisition of such an e-signature can be designated in metadata of the subject document. The actual subject document, more specifically a single shared copy of the actual subject document can be maintained wholly within the CMS (step 255). As such the vulnerabilities associated with emailing attachments (e.g., using SMTP) can be eliminated. Moreover, the location of and shared access to the subject document can be designated manually (e.g., at the time of manually defining signatories, documents, and other information that would be captured in an envelope) or, the location of and shared access to the subject document can be automatically provisioned based on enterprise-specific characteristics and/or based on operation of enterprise-specific workflows, and/or any combination thereof.

As previously discussed, the CMS can process workflows, and such workflows may make or cause changes to be made to content objects and/or, such workflows may make or cause changes to be made to content object metadata and/or any other changes in the CMS environment. In some situations, a change to any of, a content object, and/or content object metadata, and/or the CMS environment might introduce vulnerabilities or risks with respect to a document to be e-signed. In most cases, such vulnerabilities or risks with respect to a document to be e-signed can be remediated, for example, by the CMS, or by the ESS, or both. Example workflow event processing techniques are shown and described as pertains to FIG. 3A through FIG. 3E and as pertains to FIG. 4A through FIG. 4E.

Figure 3A:
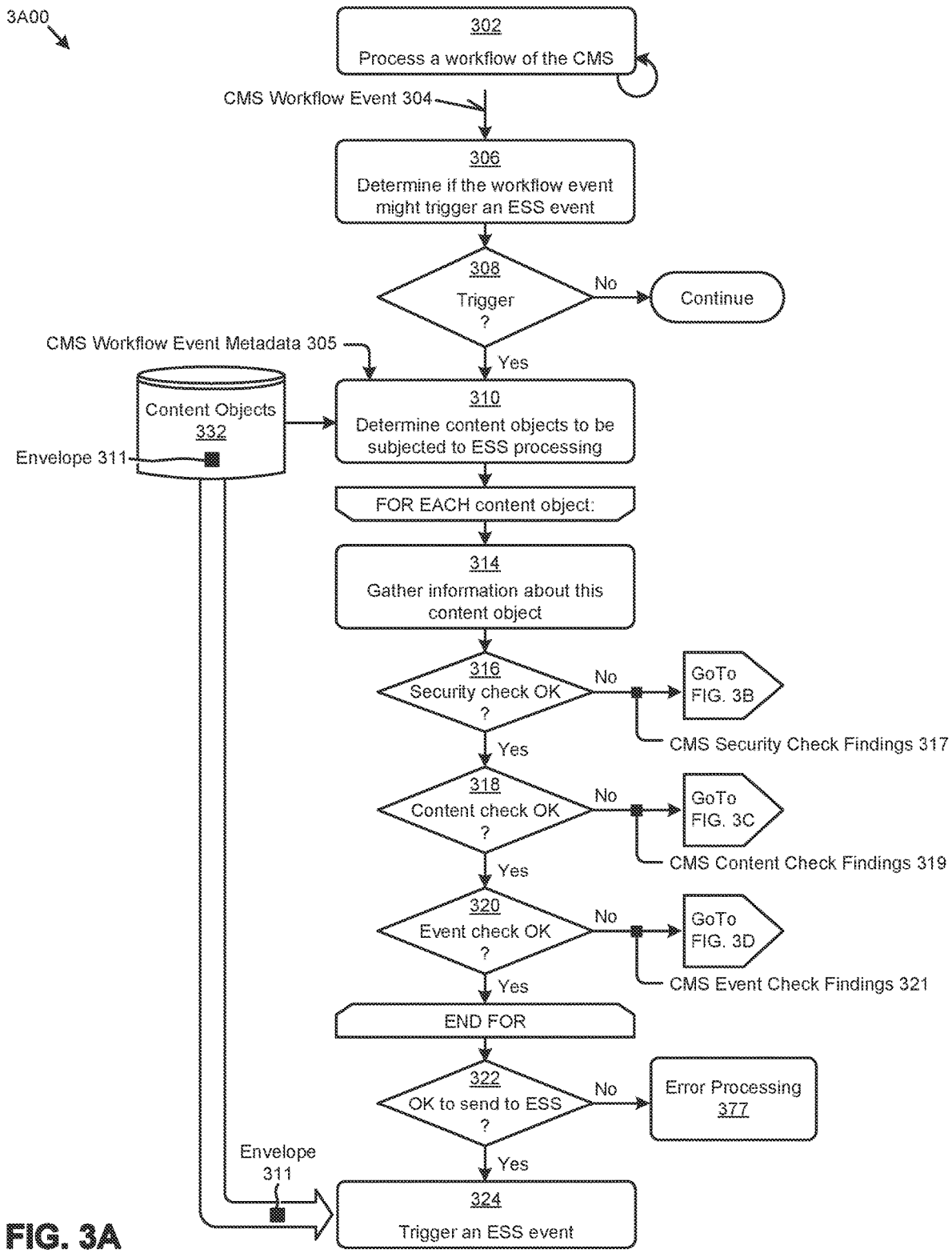
FIG. 3A depicts an example CMS workflow event processing technique as used for securely acquiring e-signatures.

FIG. 3A depicts an example CMS workflow event processing technique 3A00 as used for securely acquiring e-signatures. As an option, one or more variations of CMS workflow event processing technique 3A00 or any aspect thereof may be implemented in the context of the architecture and functionality of the embodiments described herein and/or in any environment.

The figure is being presented to explain how a workflow of a CMS can trigger an e-signature event and to explain how the data items (e.g., content objects 332) that are to be subjected to such an e-signature event can be checked (e.g., for vulnerabilities) and remediated (e.g., hardened) prior to triggering the e-sign event.

Step 302 depicts continuously processing a workflow of a CMS. Any workflow can have any number of synchronous and/or asynchronous sub-steps, any of which sub-steps can raise any number of CMS workflow events. In the specific embodiment of FIG. 3B, upon occurrence of CMS workflow event 304, step 306 is invoked. The particular step invoked or operation performed or other action taken (e.g., a listener action) may depend on the nature of the particular workflow event. For illustrative purposes, the technique of FIG. 3A is shown as processing an event that can at least potentially cause triggering of an ESS event. In fact, and as shown, step 306 analyzes an incoming event, and determines if the event might trigger an ESS event. If so, then the "Yes" path of decision 308 is taken, which in turn initiates processing of step 310, which determines which particular set of content objects might be involved in the ESS event. Strictly as one example, processing of step 310 might analyze workflow and/or workflow event metadata (e.g., CMS workflow event metadata 305) to determine that a particular set of content objects (e.g., as designated by an envelope 311 referenced by the CMS workflow event metadata) are now deemed to be ready for e-signature by the involved parties.

However, in order to reduce or eliminate vulnerabilities or risks that might arise during the course of e-signing, each constituent content object of that particular set of content objects is individually checked for vulnerabilities. In the specific embodiment of FIG. 3A, step 314 serves to gather information about each constituent content object, and then perform various checks, some of which checks might be remediable prior to sending to the ESS. In this example embodiment, each content object is subjected to a security check (e.g., check 316), a content check (e.g., check 318), and an event check (e.g., check 320). If any of the foregoing checks fail, the "No" branch of the check is taken, and findings of the failed check are passed to a corresponding remediation routine. If, after each constituent content object of that particular set of content objects has been checked, then if it is still "OK" to trigger an ESS event (e.g., the "Yes" branch of decision 322) then an ESS event is triggered (step 324). The triggering action may include providing a copy of (or providing a reference to) the envelope 311.

As can now be understood, any document that is a candidate for an ESS operation (e.g., and e-sign operation) undergoes rigorous checking before the ESS operation is triggered. In some cases, error processing 377 raises a further event or events, which event or events cause invocation of processing in still further workflows. In some cases, error processing 377 merely ends the flow such that no ESS event is triggered, and such that the flow can be again invoked when a CMS workflow event is received at step 306. Indeed, it can happen that a document is constantly undergoing changes, reviews, copying, renaming, security reclassification, PII detection, etc. Accordingly, step 306 may be entered repeatedly, and there may be many passes through the checks (check 316, check 318, check 320). As such, processing through the flow of FIG. 3A may happen many times before an ESS event is triggered by step 324.

Strictly as examples of what can happen to a document over time, and more specifically, what conditions can be considered as a document passes through the checks (check 316, check 318, check 320), consider the following:

- A document might have been inadvertently communicated over an insecure network during the course of exfiltration and/or during the course of signing and/or during the course of returning the document back to the CMS. This condition can be detected by the security check operations of check 316. Moreover this condition can be remediated by checking for malware and if malware is found, then restarting the signing process with a cleaned copy of the content object to be signed. Strictly as an example, malware might be found in a Microsoft Word document in the form of a macro. Or, malware might be found in a ZIP archive attachment (e.g., a "zip bomb"). Such conditions can be detected by the security check operations of check 316. Moreover, such conditions can be remediated by invalidating a corresponding sign request and optionally restarting the signing process with content objects that have been cleaned of such malware.
- A document might have been inadvertently modified (e.g., during the course of signing) to contain PII. This condition can be detected by the content check operations of check 318. Moreover this condition can be remediated by removing or blurring-out the detected PII then restarting the signing process with a PII-cleaned copy of the content object to be signed.
- A document and/or its metadata might be legitimately modified and/or permissions changed in a manner that would invalidate any previous signatures. This condition can be detected by the event check operations of check 320. Moreover, in some cases, this condition can be remediated by marking the envelope so as to indicate that all previous signers need to sign again (i.e., to sign the modified document). In some cases, the event check operations of check 320 might determine that a signatory had changed, and/or that the email alias or other contact information might have changed. In such a case, this condition can be remediated by marking the envelope in accordance with the changed information and re-sending the envelope to the changed/updated email alias.

The foregoing are merely illustrative examples, and many other conditions and/or remediations are possible. The following figures FIG. 3B through FIG. 3E depict example remediation techniques as employed by a content management system. The remediation techniques as shown in each of FIG. 3B through FIG. 3E include processing that is initiated in response to receipt of respective check findings, which check findings derive from the checks of FIG. 3A. Specifically, the security remediation of FIG. 3B is responsive, at least in part, to CMS security check findings 317 as generated during the security checks of check 316; the content remediation of FIG. 3C is responsive, at least in part, to CMS content check findings 319 as generated during the content checks of check 318; and the event-based remediation of FIG. 3C is responsive, at least in part, to CMS event check findings 321 as generated during the event checks of check 316.

FIG. 3B through FIG. 3E depict example remediation techniques as employed by a content management system. As an option, one or more variations of remediation techniques of FIG. 3B through FIG. 3E or any aspect thereof may be implemented in the context of the architecture and functionality of the embodiments described herein and/or in any environment.

FIG. 3B through FIG. 3E are being presented to illustrate how findings of the foregoing checks (e.g., security check, content check, event check) can be carried out to produce findings (e.g., possible vulnerabilities), which in turn can be considered for remediation. Except in those cases when a finding that includes a fatal condition is encountered, any/all of the findings can be remediated. In some cases, such remediation occurs wholly within the CMS. In some cases, remediation occurs wholly within the EMS. In some cases, remediation occurs partially within the CMS and partially within the ESS.

The need for remediation can be detected by applying one or more rules to then-current conditions. In example embodiments, any discovered then-current conditions can be formulated as findings (e.g., parameters, values) that are used to identify and fire applicable rules. The rules can be configured such that a fired rule may acquire parameters from both (or either) the ESS and the CMS. Further, the rules can be configured to apply some logic over the acquired parameters to lead to an action. In many cases, the action includes formulation of one or more remediation instructions. In many cases, the action includes formulation of one or more security vulnerability remediation instructions. A rule can compare then-current environmental conditions to then-current security parameter values, and on the basis of the results of the comparison, the rule can invoke one or more security remediation actions. A security remediation action might disallow some request, or a security remediation action might recommend an action to be taken by the user, or a security remediation action might allow an action to be taken now, even though that action was previously disallowed (e.g., under a different set of environmental conditions), or a remediation action might be to emit one or more remediation instructions (e.g., to be executed by a user device).

To illustrate by example, and referring to the remediation techniques of FIG. 3B, it might happen that the one of the received security check findings 316 includes a finding that a subject content object that is included in an envelope for e-signing is a document that is under a legal hold. This can be determined by, for example, inspection of the content object metadata that is associated with the subject content object. This is an example situation that can, at least potentially, be remediated via carrying out of one or more remediation instructions. In such a situation, and referring again to FIG. 3B, condition check 325 can proceed down the "No" path into step 326, whereupon a security remediation (e.g., via an instruction to remove the subject content object from the envelope) can be applied. On the contrary, if it is determined that the subject content object is under legal hold and it is also determined that the subject content object is an indispensable document for the e-signing process, then the "Yes" branch of condition check 325 is taken and the nature of the offending condition is reported.

To further illustrate by example, and referring to the remediation techniques of FIG. 3C, it might happen that one of the received content check findings 318 includes a finding that a subject content object that is included in an envelope for e-signing is a document that includes personally identifiable information. This situation can be remediated by deleting or by blurring the PII from the subject content object prior to invoking ESS activities that would access the subject content object. Additionally or alternatively, the PII-containing subject content object might be marked (e.g., in the envelope) as an item that is prohibited from being exfiltrated across a particular political boundary.

Additionally or alternatively, in the event of finding that a subject content object includes personally identifiable information, the subject content object itself can be marked as being subject to an information handling request (e.g., a General Data Protection Regulation (GDPR) request or a California Consumer Privacy Act (CCPA) request). Additionally or alternatively, in the event of a finding that a subject content object includes personally identifiable information, the subject content object itself can be modified to redact offending portions. Strictly as one technique for redaction, a PDF can be modified using Adobe Acrobat PDF-native facilities.

Additionally or alternatively, the received content check findings 318 might include a finding that a subject content object is marked as originating from a particular environment (e.g., a sandbox, a suspicious location), and/or as having been generated using a beta- or developer-API version, in which cases, the "Yes" branch of decision 327 is taken, whereafter the subject content object can be watermarked or otherwise hardened (e.g., via the processing of step 329) so as to identify its provenance (e.g., as pertaining to a particular user, or as originating from a beta tester or developer). Strictly as one example, hardening of a subject content object can be accomplished by applying a visible identification (e.g., a watermark) to the subject content object, where the visible identification corresponds to the identity of the user who is e-signing from a particular user device.

To illustrate still further situations by example, and referring to the remediation techniques of FIG. 3D, it might happen that one of the received event check findings 320 includes a finding that a subject content object had been the subject of some action taken since the last set of event checks. This situation can arise at any time and for any reason. For example, it might have happened that the subject content object had been edited, thus introducing the possibility that the subject content object should again be checked. More specifically, it might have happened that the subject content object had been edited to increase the deal size (e.g., contract amount) showing in the subject content object, thus introducing the possibility that the subject content object would need to be signed by an additional signatory. This can be remediated by adding the additional signatory to the envelope.

Many use cases are addressed when remediating based on events that had occurred in relation to a subject document. As shown in FIG. 3D, when findings pertaining to events that had occurred in relation to a subject document are received (e.g., vis the shown CMS event check findings 321), the particular findings can be considered and corresponding remediation steps can be applied (step 330).

Strictly as an example, it can happen that a login event and an access event pertaining to a subject document was deemed to be suspicious. Additionally or alternatively, a device login event and an access event pertaining to a subject document might have been identified as including an IP connection through an IP domain or router that is known to be associated with malicious activities. Based on such a finding, the situation can be remediated by marking the subject document (e.g., via its metadata) as "do not exfiltrate", and/or by invalidating the login, and/or by issuing a warning or error message to the device, and/or by issuing instructions for display on the device. In this latter case, instructions for display on the device might recommend that the user of the device should try to log in from elsewhere.

As another example, an administrative command and/or metadata pertaining to the subject document might have been applied or the metadata constituency might have changed. In such a situation, the effect of the administrative command and/or the metadata change can be assessed and remediated. In some situations, cascading effects of metadata changes can be considered. That is, a change in a value of a first metadata item might cascade to a value change of a second metadata item. This can happen, for example when a second metadata item is a function of the first metadata item. To illustrate, a metadata item referring to a "total_contract_value" might take on a new value when the metadata item referring to "contract_term" is changed. The foregoing scenarios are merely example scenarios, Any of a variety of findings can be remediated via the processing of appropriately configured steps. Some examples of remediations pertaining to different remediation types are shown and discussed as pertains to FIG. 3E.

Figure 3E:
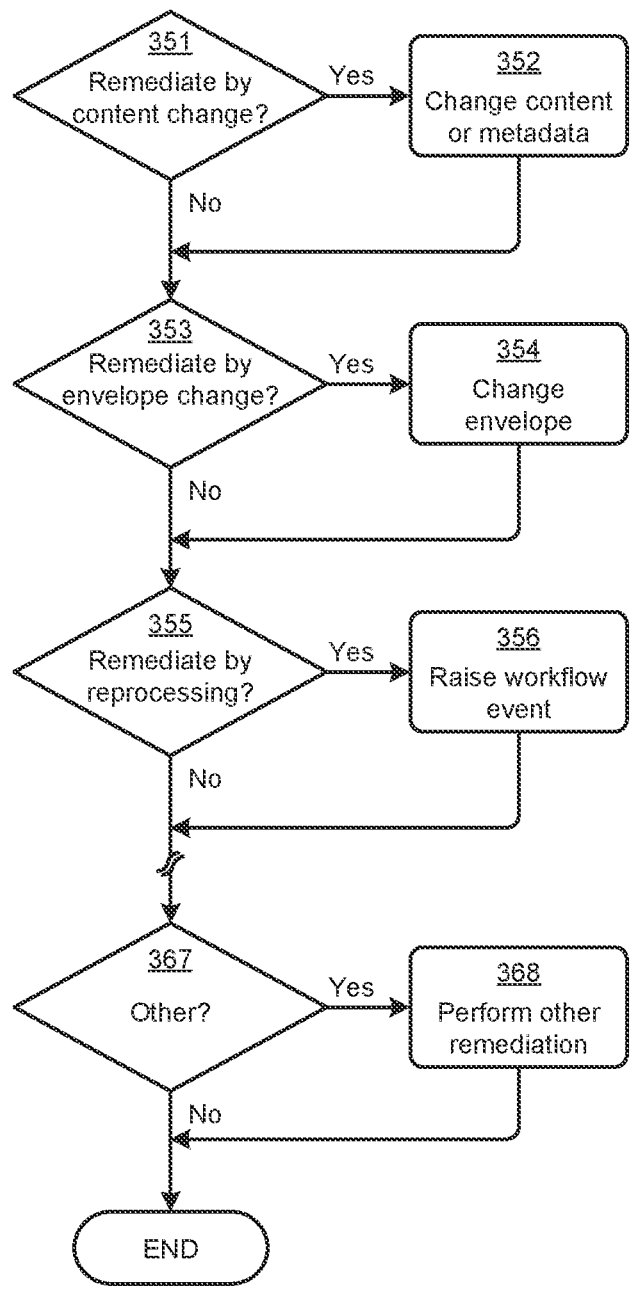

FIG. 3E shows a sample set of remediations that can be applied based on determination of a particular type of remediation. The figure shows how a particular type of remediation can be applied when applying a CMS security remediation (step 326, as shown), and/or when applying a CMS content remediation (step 329, as shown), and/or when applying a CMS event-dependent remediation (step 330) as shown.

In this embodiment, any/all remediation types can be carried out in succession. Specifically, and as shown, a first test (decision 351) serves to determine if there is a particular remediation that can be applied by making a change to a content object (step 352) and/or its metadata; a second test (decision 353) serves to determine if there is a particular remediation that can be applied by making a change to an envelope (step 354); a third test (decision 355) serves to determine if there is a particular remediation that can be applied by reprocessing such as by raising an event in a workflow (step 356). Strictly as one example, a reprocessing event might be raised if some aspect of the envelope or its constituents had undergone some modification since the previous envelope had been sent. As such, if a security level on a content object was changed, the then-current conditions can be assessed (e.g., by raising an event in a workflow) with respect to implications of the changed security level. The specific workflow that is invoked by operation of step 356 can be enterprise-specific. In some cases, such an enterprise-specific workflow can be executed by a proxy process that takes on a proxy user identity that has a raised level of authorization.

Other types of remediation can be considered as well. This is shown by decision 367 and step 368. Strictly as one example, it can happen that the responsibility of a particular signatory changes during the e-signing procedure (e.g., in the event of a role/title change, a promotion, a retirement, etc.). In such a situation, the remediation pertaining to this "offboarding" event might be to cause the CMS to invalidate the previous e-signatures of the previous signatories and substitute—in the new signatory into the envelope. The ESS system would then receive updated instructions from the CMS (e.g., via the updated envelope) after which the ESS would seek to secure the e-signatures from the new signatory.

The foregoing examples are merely selected examples pertaining to (1) detection, identification and remediation of a security vulnerability (e.g., as depicted in FIG. 3C), (2) detection, identification and remediation of a change of a content object that influences the e-signature process (e.g., as depicted in FIG. 3D), and (3) detection, identification and remediation of events that change the environment in a manner that influences the e-signature process (e.g., as depicted in FIG. 3E). However, these are just illustrative examples of detectable conditions and/or detectable changes in the environments in which components of the foregoing system operate. The specific operational element that performs the detection and the specific operational element that performs the remediation can vary. FIG. 4A through FIG. 4E pertains to specific additional and/or alternative sets of detections and remediations. Specifically, FIG. 4A through FIG. 4E are being presented to illustrate how additional and/or alternative sets of detections and remediations can be implemented in an ESS workflow.

Figure 4A:
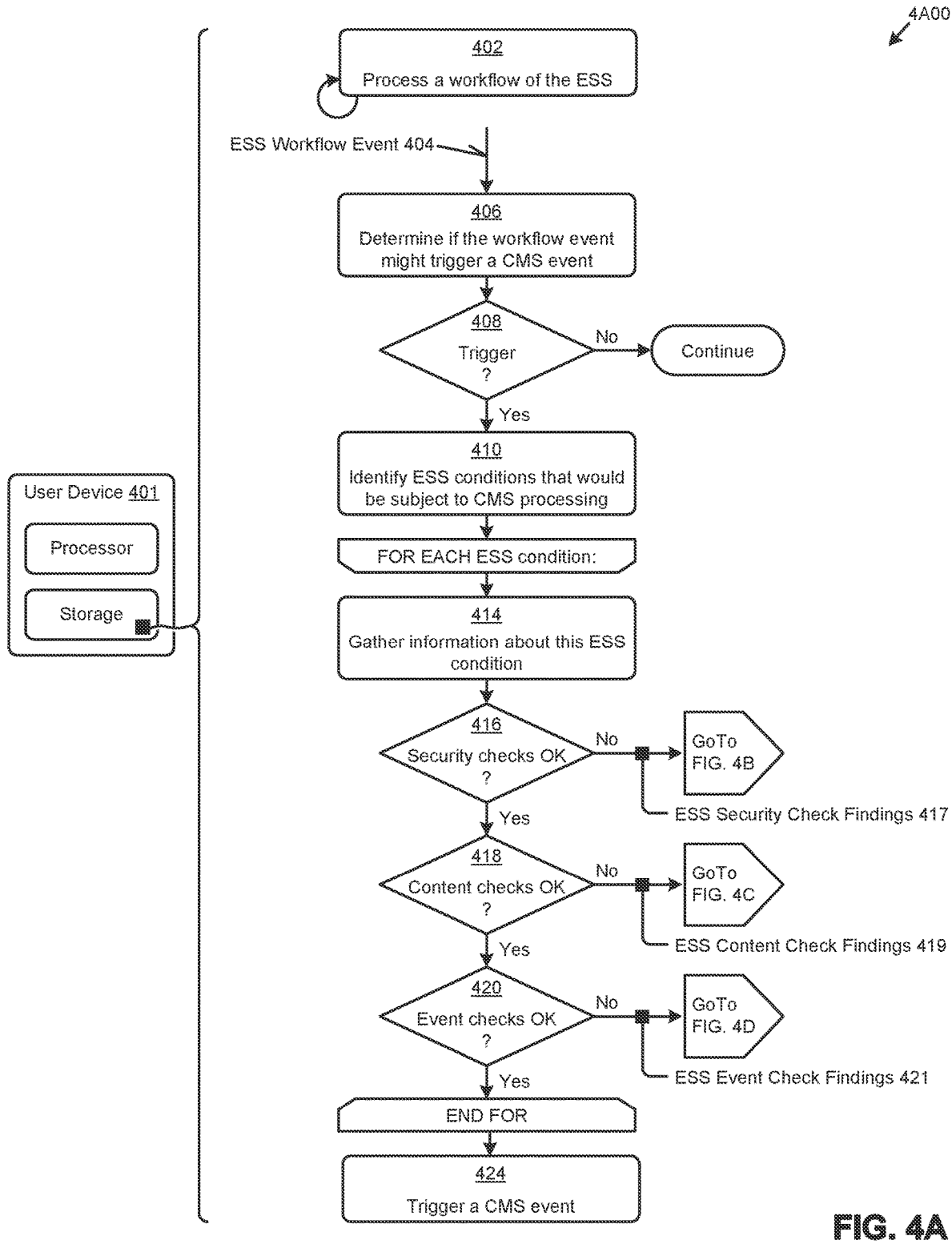
FIG. 4A depicts an example ESS workflow event processing technique as used for securely acquiring e-signatures, according to an embodiment.

FIG. 4A depicts an example ESS workflow event processing technique 4A00 as used for securely acquiring e-signatures. As an option, one or more variations of ESS workflow event processing technique 4A00 or any aspect thereof may be implemented in the context of the architecture and functionality of the embodiments described herein and/or in any environment.

FIG. 4A is being presented to explain how a user device 401 can carry out various steps and make decisions based on information available at the user device. As shown, step 402 to process a workflow of the ESS is carried out on an ongoing basis. Specifically, the workflow of the ESS is carried out when the processor of the user device is executing instructions and when the storage (e.g., code storage, data storage, etc.) of the user device is available to the processor. At any moment in time when the user device is executing instructions, those instructions ESS might raise ESS workflow event 404. Such an event can be raised by the ESS workflow itself, or by some other module (e.g., a power-up module).

Upon recognition of ESS workflow event 404, step 406 serves to determine if that event might in turn trigger a CMS event. Strictly as one example, ESS workflow event 404 might indicate that a document has been e-signed and, as such, the CMS should be notified that the act of e-signing has completed. As another example, ESS workflow event 404 might indicate that a command has been received from the CMS and, as such, the command should be processed at the user device. There can be many different events that are raised while the user device is processing a workflow of the ESS, some of which pertain to internal events within the ESS, and some of which are of a nature that would trigger processing at the CMS.

Step 406 and decision 408 serve to determine if the then-current ESS workflow event is of a nature that would trigger processing at the CMS. If not, then the "No" branch of decision 408 would be taken, and the user device would continue to process the ESS workflow internally on the user device. On the other hand, if the then-current ESS workflow event is determined to be of a nature that would trigger processing at the CMS then, the "Yes" branch of decision 408 is taken and the ESS identifies conditions (step 410) that might need to be subjected to CMS processing. There may be many conditions that might be subjected to CMS processing. As such, a FOR EACH loop is entered to consider each condition in turn.

In this example embodiment, the first step in the FOR EACH iteration loop (step 414) gathers information about the particular condition. Thereafter, the ESS performs processing to determine if the security checks pass (step 416), processing to determine if the content checks pass (step 418), and processing to determine if the event checks pass (step 420). If it is determined that there is at least one check that did not pass, then the "No" branches of the checks (e.g., the "No" branch of decision 416, the "No" branch of decision 418, and the "No" branch of decision 420) are taken and the check results (e.g., ESS security check findings 417, ESS content check findings 419, and ESS event check findings 421) are provided to downstream processing. The downstream processing is carried out for this particular iteration over the then-current ESS conditions. In some cases, and as shown, after the iterations over the ESS conditions have been considered and possibly remediated, then step 424 serves to trigger one or more CMS events. The one or more CMS events might correspond with CMS events that are paired with ESS workflow event 404, and/or the one or more CMS events might correspond with CMS events that are determined during remediation processing. A sample set of remediation techniques are depicted in the following FIG. 4B, FIG. 4C, FIG. 4D and FIG. 4E.

FIG. 4B through FIG. 4E depict example remediation techniques as employed by an e-signature system. As an option, one or more variations of remediation techniques of FIG. 4B through FIG. 4E or any aspect thereof may be implemented in the context of the architecture and functionality of the embodiments described herein and/or in any environment.

Specifically, and as shown in FIG. 4B, during the FOR EACH processing over each finding in ESS security check findings 417, it might happen that the user device had been subjected to a network path change (e.g., from a network handover from a first mobile cellular service provider to a second mobile cellular service provider), thus at least potentially increasing the vulnerability of the user device in a manner that would need some form of verification and/or authorization from the CMS. In this situation, and following the "Yes" branch of decision 425, it might happen that during the remediation processing of step 426, a particular CMS command or event might be raised. Otherwise, and following the "No" branch of decision 425, a report is generated to alert system components that a fatal condition has been encountered.

Merely for illustrative purposes, the CMS command or event might correspond with a command or event that conveys the semantics of "provide authorization for e-signing while connected via this IP socket".

The foregoing is merely one example of remediation processing that pertains to security check findings. There can also be remediation processing that pertains to content check findings as well as remediation processing that pertains to event check findings. FIG. 4C depicts remediation processing that pertains to content check findings 419. FIG. 4D depicts remediation processing that pertains to event check findings 421.

Specifically, and as shown in FIG. 4C, during the FOR EACH processing over each finding in ESS content check findings 419, it might happen that a particular document to be signed was deemed by the ESS to have been corrupted (e.g., due to some device-local problem, or due to some sort of 'man-in-the-middle' tampering). As such, during the remediation processing of decision 427, a CMS command or event to request a refreshed copy might be raised.

Still further, and as shown in FIG. 4D, during the FOR EACH processing over each finding in ESS event check findings 421, it might happen that the user's authentication certificate was revoked, or that an earlier-provided authorization token for the user device has been revoked, etc. As such, during the remediation processing of step 429, a CMS command or event to abort the current e-signing activities (e.g., withdraw the envelope) might be raised.

Figure 4E:
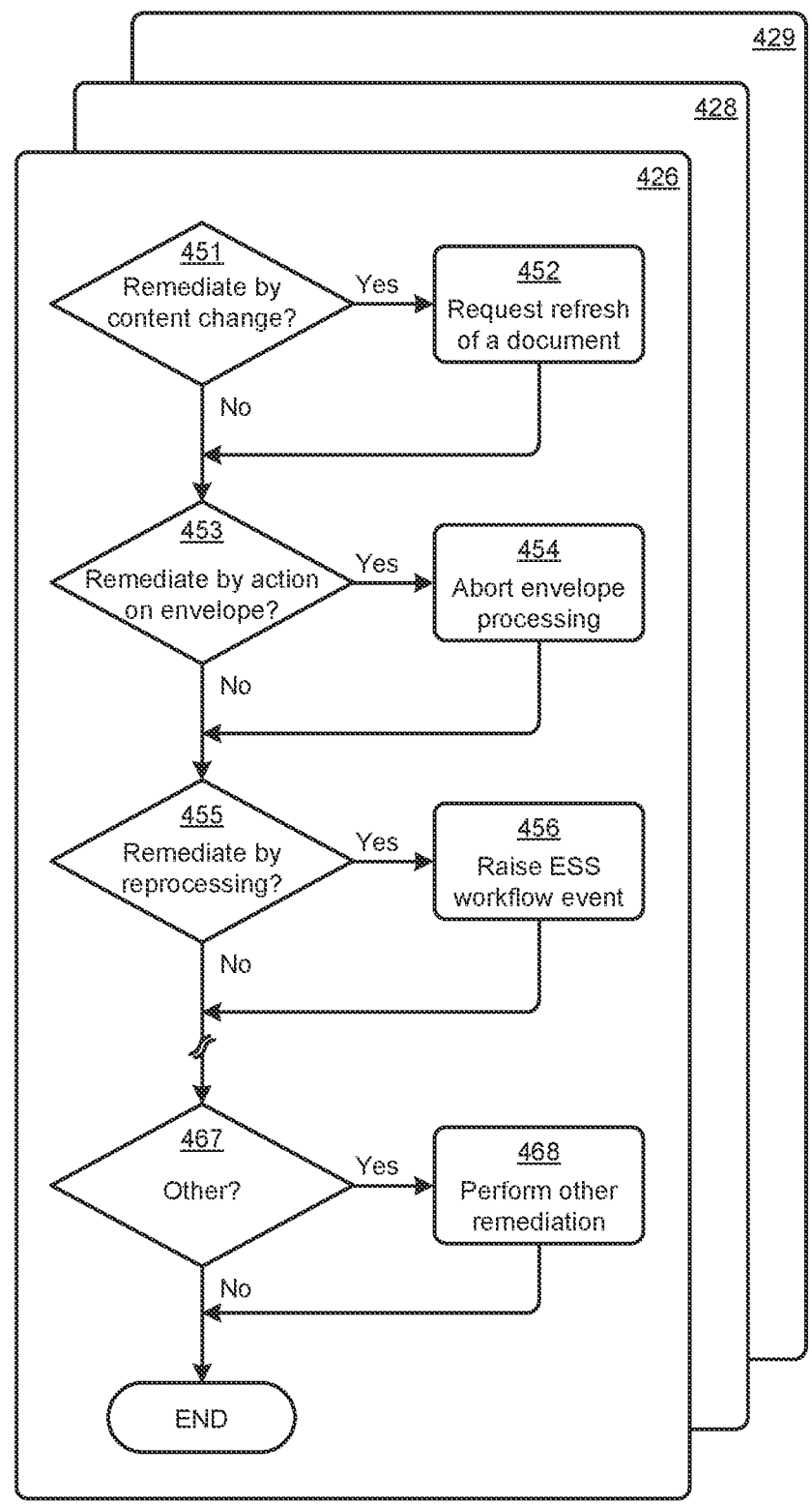

The foregoing scenarios are merely example scenarios. Any of a variety of findings can be remediated via the processing of appropriately configured steps. FIG. 4E shows a sample set of remediations that can be applied based on determination of a particular type of remediation. The figure shows how a particular type of remediation can be applied when applying an ESS security remediation (step 426, as shown), and/or when applying an ESS content remediation (step 428, as shown), and/or when applying an ESS event-dependent remediation (step 429, as shown).

In this embodiment, any/all remediation types can be carried out in succession. Specifically, and as shown, a first test (decision 451) serves to determine if there is a particular remediation that can be applied by requesting a refresh of a document to be e-signed (step 452); a second test (decision 453) serves to determine if there is a particular remediation that can be applied by taking an action on an envelope, such as by aborting envelope processing at the user device (step 454) and sending a corresponding command to the CMS; a third test (decision 455) serves to determine if there is a particular remediation that can be applied by reprocessing such as by raising an event in an ESS workflow (step 456). Other types of remediation can be considered as well. This is shown by decision 467 and step 468. Strictly as one example, it can happen that the device that a signatory is using (e.g., smart phone, laptop, Internet café computer, etc.) cannot be verified as trustworthy by the ESS. In such a situation, the ESS might initiate a call a CMS-hosted API or CMS-hosted web service, or raise an event at the CMS for the CMS to authenticate the device and/or assign a trust level to the device. In some cases, the remediation is to disallow e-signing at that moment in time, and/or under those in situ conditions. In some cases, the remediation includes advising the signatory to try again from a different location, and/or under different conditions. In some cases, the remediation includes alerting the CMS of in situ conditions that were detected by the ESS and/or by a user device, and allowing the CMS to determine one or more mechanisms for remediation.

The foregoing examples are merely selected examples pertaining to (1) detection and remediation of a security vulnerability (e.g., as depicted in FIG. 4C), (2) detection and remediation of a change of a content object that influences the e-signature process (e.g., as depicted in FIG. 4D), and (3) detection and remediation of events that change the environment in a manner that influences the e-signature process (e.g., as depicted in FIG. 4E). However, these are just illustrative examples of detectable conditions and/or detectable changes in the environments in which components of the foregoing system operate. There are additional situations where events of the CMS and/or the ESS correspond to other aspects of security and/or other aspects of changes to content objects and/or other aspects of an occurrence or series of occurrences of events alter the environment in a manner that influences the e-signature process.

Instruction Code Examples

Figure 5A:
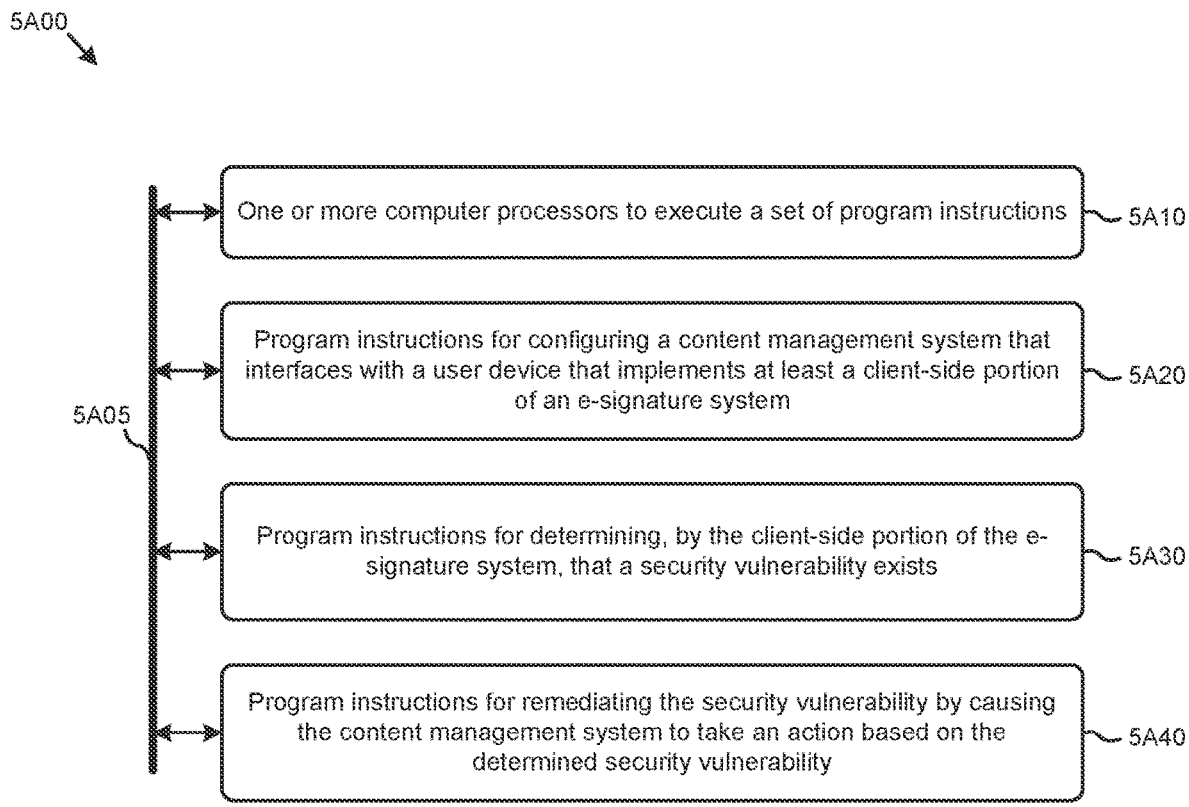
FIG. 5A and FIG. 5B depict system components as arrangements of computing modules that are interconnected so as to implement certain of the herein-disclosed embodiments.

FIG. 5A depicts a system 5A00 as an arrangement of computing modules that are interconnected so as to operate cooperatively to implement certain of the herein-disclosed embodiments. This and other embodiments present particular arrangements of elements that, individually or as combined, serve to form improved technological processes that address remediation of operational vulnerabilities during e-signature acquisition. The partitioning of system 5A00 is merely illustrative and other partitions are possible. As an option, the system 5A00 may be implemented in the context of the architecture and functionality of the embodiments described herein. Of course, however, the system 5A00 or any operation therein may be carried out in any desired environment. The system 5A00 comprises at least one processor and at least one memory, the memory serving to store program instructions corresponding to the operations of the system. As shown, an operation can be implemented in whole or in part using program instructions accessible by a module. The modules are connected to a communication path 5A05, and any operation can communicate with any other operations over communication path 5A05. The modules of the system can, individually or in combination, perform method operations within system 5A00. Any operations performed within system 5A00 may be performed in any order unless as may be specified in the claims. The shown embodiment implements a portion of a computer system, presented as system 5A00, comprising one or more computer processors to execute a set of program code instructions (module 5A10) and modules for accessing memory to hold program code instructions to perform: configuring a content management system that interfaces with a user device that implements at least a client-side portion of an e-signature system (module 5A20); determining, by the client-side portion of the e-signature system, that a security vulnerability exists (module 5A30); and remediating the security vulnerability by causing the content management system to take an action based on the determined security vulnerability (module 5A40).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 5B:
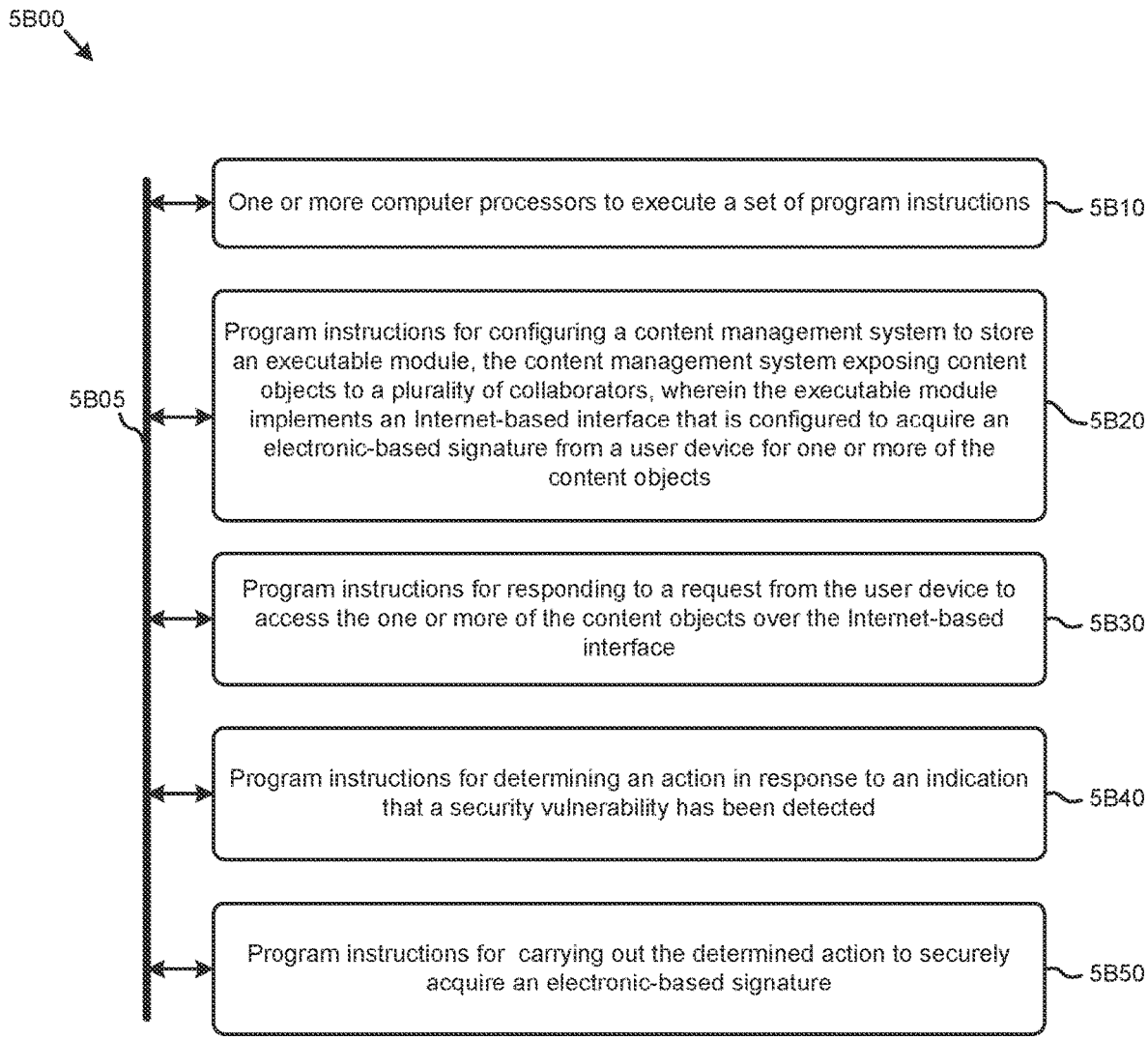

FIG. 5B depicts a system 5B00 as an arrangement of computing modules that are interconnected so as to operate cooperatively to implement certain of the herein-disclosed embodiments. The partitioning of system 5B00 is merely illustrative and other partitions are possible. As an option, the system 5B00 may be implemented in the context of the architecture and functionality of the embodiments described herein. Of course, however, the system 5B00 or any operation therein may be carried out in any desired environment. The system 5B00 comprises at least one processor and at least one memory, the memory serving to store program instructions corresponding to the operations of the system. As shown, an operation can be implemented in whole or in part using program instructions accessible by a module. The modules are connected to a communication path 5B05, and any operation can communicate with any other operations over communication path 5B05. The modules of the system can, individually or in combination, perform method operations within system 5B00. Any operations performed within system 5B00 may be performed in any order unless as may be specified in the claims. The shown embodiment implements a portion of a computer system, presented as system 5B00, comprising one or more computer processors to execute a set of program code instructions (module 5B10) and modules for accessing memory to hold program code instructions to perform: configuring a content management system to store an executable module, the content management system exposing content objects to a plurality of collaborators, wherein the executable module implements an Internet-based interface that is configured to acquire an electronic-based signature for one or more of the content objects, using a user device (module 5B20); responding to a request from the user device to access the one or more of the content objects over the Internet-based interface (module 5B30); determining an action in response to an indication that a security vulnerability has been detected (module 5B40); and carrying out the determined action to securely acquire an electronic-based signature (module 5B50).

System Architecture Overview

Additional System Architecture Examples

Figure 6A:
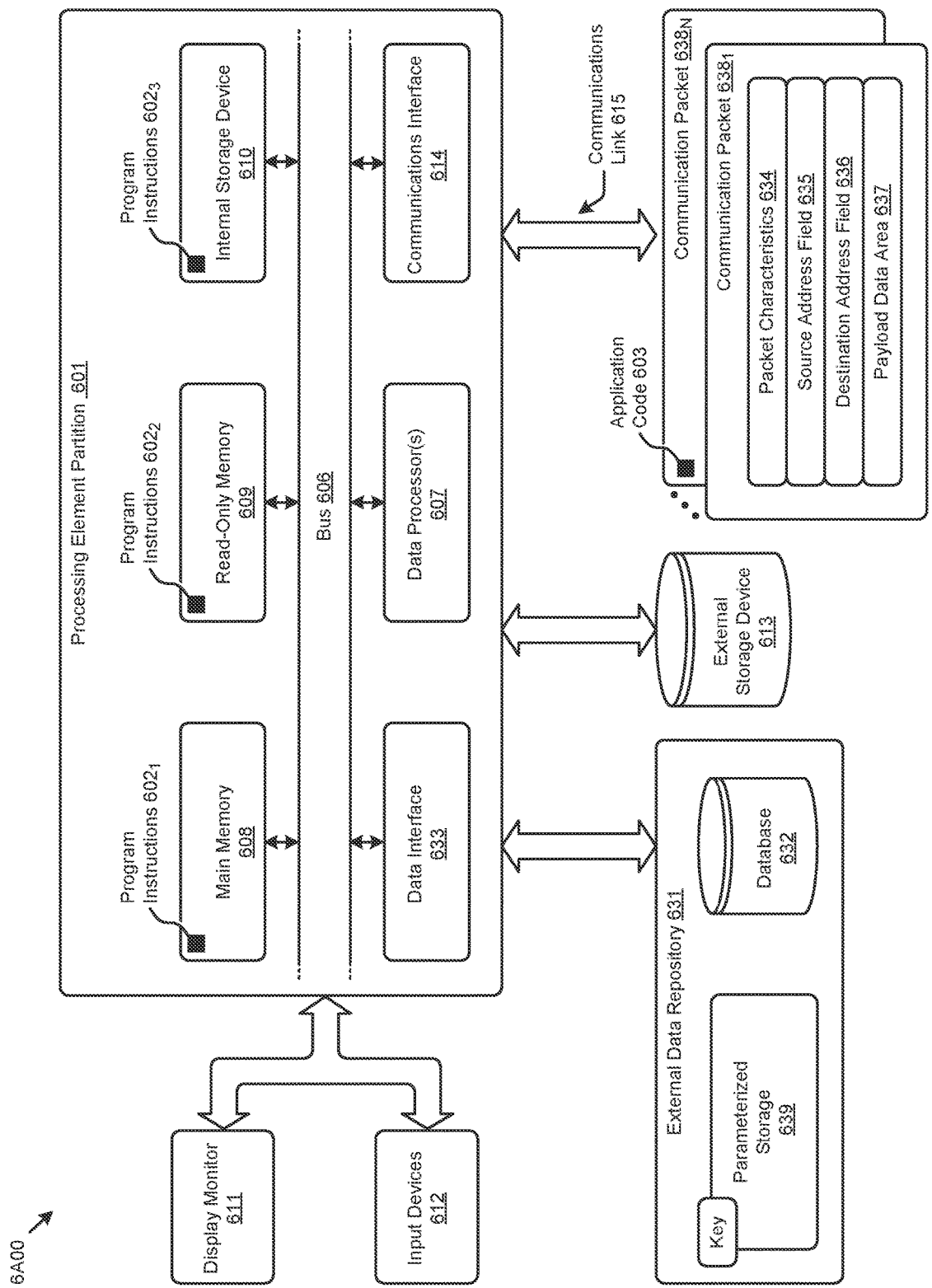
FIG. 6A and FIG. 6B present block diagrams of computer system architectures having components suitable for implementing embodiments of the present disclosure and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a central processing unit (CPU), or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. Computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program instructions contained in a memory. Such instructions (e.g., program instructions 6021, program instructions 6022, program instructions 6023, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 6A00 performs specific networking operations using one or more instances of communications interface 614. Instances of communications interface 614 may comprise one or more networking ports that are configurable (e.g., pertaining to speed, protocol, physical layer characteristics, media access characteristics, etc.) and any particular instance of communications interface 614 or port thereto can be configured differently from any other particular instance. Portions of a communication protocol can be carried out in whole or in part by any instance of communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

Communications link 615 can be configured to transmit (e.g., send, receive, signal, etc.) any types of communications packets (e.g., communication packet 6381, communication packet 638N) comprising any organization of data items. The data items can comprise a payload data area 637, a destination address 636 (e.g., a destination IP address), a source address 635 (e.g., a source IP address), and can include various encodings or formatting of bit fields to populate packet characteristics 634. In some cases, the packet characteristics include a version identifier, a packet or payload length, a traffic class, a flow label, etc. In some cases, payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of a computer system 6A00. According to certain embodiments of the disclosure, two or more instances of computer system 6A00 coupled by a communications link 615 (e.g., LAN, public switched telephone network, or wireless network) may perform the sequence of instructions required to practice embodiments of the disclosure using two or more instances of components of computer system 6A00.

Computer system 6A00 may transmit and receive messages such as data and/or instructions organized into a data structure (e.g., communications packets). The data structure can include program instructions (e.g., application code 603), communicated through communications link 615 and communications interface 614. Received program instructions may be executed by data processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

Processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to determining security vulnerabilities and performing remediation when processing documents for e-signature. A module may include one or more state machines and/or combinational logic used to implement or facilitate the operational and/or performance characteristics pertaining to determining security vulnerabilities and/or performing remediation when processing documents for e-signature.

Various implementations of database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of determining security vulnerabilities and performing remediation when processing documents for e-signature). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to determining security vulnerabilities and performing remediation when processing documents for e-signature, and/or for improving the way data is manipulated when performing computerized operations pertaining to remediating operational vulnerabilities during e-signature acquisition.

Figure 6B:
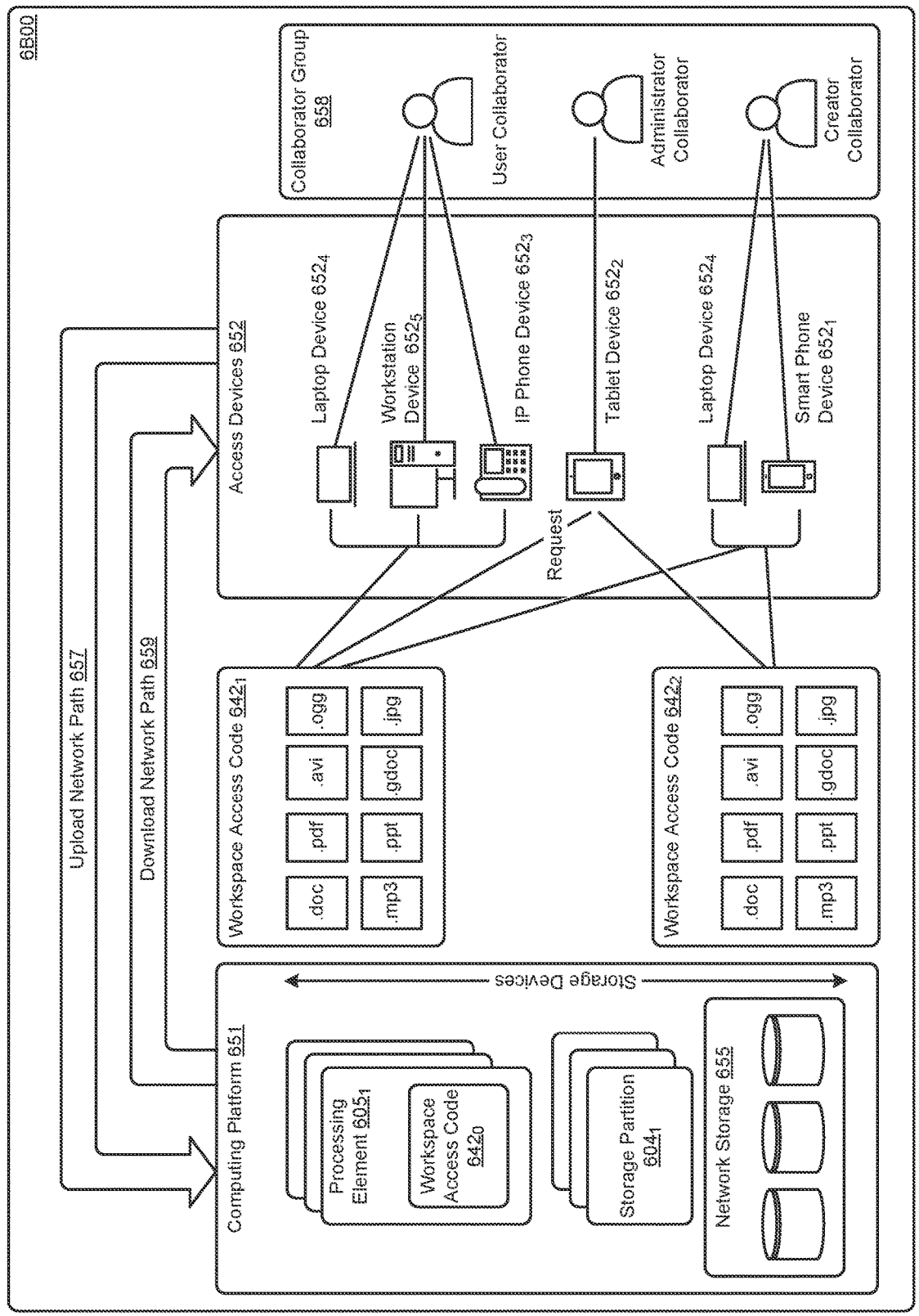

FIG. 6B depicts a block diagram of an instance of a cloud-based environment 6B00. Such a cloud-based environment supports access to workspaces through the execution of workspace access code (e.g., workspace access code $642_0$, workspace access code $642_1$, and workspace access code $642_2$). Workspace access code can be executed on any of access devices 652 (e.g., laptop device $652_4$, workstation device $652_5$, IP phone device $652_3$, tablet device $652_2$, smart phone device $652_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of collaborators can form a collaborator group 658, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 651, including in a middleware setting. As shown, a portion of the workspace access code resides in and can be executed on one or more processing elements (e.g., processing element $605_1$). The workspace access code can interface with storage devices such as networked storage 655. Storage of workspaces and/or any constituent files or objects, and/or any other code or scripts or data can be stored in any one or more storage partitions (e.g., storage partition $604_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 657). A stored workspace can be delivered to a particular user and/or shared with other particular users via a download (e.g., a download from a processing element to an access device over a download network path 659).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for securely acquiring and managing electronic-based signatures by a content management system, the method comprising:
   identifying an executable module from a content management system that hosts and exposes a content object to a plurality of collaborators for collaboration, wherein
      the collaboration comprises collaboratively modifying the content object or metadata pertaining to the content object by at least some of the plurality of collaborators in a collaboration event hosted on the content management system, and
      the executable module implements an Internet-based interface that is used to acquire an electronic-based signature for the content object, using a user device connected to an electronic signature system or subsystem;

determining a document processing result pertaining to a request from the user device to access the content object over the Internet-based interface;

when the document processing result is determined to arise out of the electronic signature system or subsystem, performing, by the content management system, an action on the content object to remediate the document processing result based at least in part upon a multi-stage check that is performed on the content object or the collaboration event, wherein the document processing result arising out of the electronic signature system or subsystem indicates a first vulnerability or risk and pertains to acquiring the electronic-based signature on the electronic signature system or subsystem; and when the document processing result is determined to arise out of the content management system, determining and sending an instruction from the content management system to the electronic signature system or subsystem, wherein execution of the instruction on the electronic signature system or subsystem remediates the document processing result, and the document processing result arising out of the content management system indicates a second vulnerability or risk in acquiring the electronic-based signature on the electronic signature system or subsystem; and triggering the electronic-signature system or subsystem that carries out at least the instruction to securely acquire the electronic-based signature.

2. The method of claim 1, further comprising remediating the first vulnerability or risk by causing the content management system to take the action based at least in part on the first security vulnerability or risk, wherein the action is determined based at least in part upon a bilateral information exchange in which the content management system and the electronic signature system or subsystem send derived information to one another, and the bilateral information exchange comprising information pertaining to the first security vulnerability or risk and information pertaining to the plurality of collaborators or the collaboration event.

3. The method of claim 1, further comprising:
performing the multi-stage check at least by:
in response to a determination that the content object is subject to an electronic signature processing at the electronic signature system or subsystem, performing, on the content management system, a security check on the content object.

4. The method of claim 3, performing the multi-stage check further comprising in response to a completion of the security check, performing, on the content management system, a content check on the content object.

5. The method of claim 1, wherein the second vulnerability or risk corresponds to a network path that involves a hop that is deemed to be a suspicious location, and the action taken by the content management system is to send the instruction to disallow an e-signature from taking place over the network path.

6. The method of claim 4, performing the multi-stage check further comprising in response to a completion of the content check, performing, on the content management system, an event check on the collaboration event.

7. The method of claim 6, further comprising:
passing a finding of failure of the security check, the content check, or the event check to a remediation process; and
remediating, by at least the remediation process, the first vulnerability or risk by causing the user device to take the action based on the first vulnerability or risk.

8. The method of claim 1, wherein an indication from the user device that the first vulnerability or risk has been detected by the user device corresponds to a network path change, the action taken by the content management system is to disallow acquisition of the electronic-based signature from taking place over the network path, and the method further comprises at least one of a plurality of acts, the plurality of acts comprising:

downloading, from the content management system to the user device, an additional executable module that implements at least a call to the Internet-based interface;

upon the indication that the first vulnerability or risk has been detected, then deferring acquisition of the electronic-based signature to a later time; or performing document hardening by watermarking a subject content object with a visible identification corresponding to a user of the user device and advising the user device that a hardened document is available as a new subject document.

9. A non-transitory computer readable medium having stored thereon a sequence of instructions which, when stored in memory and executed by one or more processors causes the one or more processors to perform a set of acts for securely acquiring and managing electronic-based signatures by a content management system, the set of acts comprising:

identifying an executable module from a content management system that hosts and exposes a content object to a plurality of collaborators for collaboration, wherein the executable module implements an Internet-based interface that is used to acquire an electronic-based signature for the content object, using a user device connected to an electronic signature system or subsystem;

determining a document processing result pertaining to a request from the user device to access the content object over the Internet-based interface;

when the document processing result is determined to arise out of the electronic signature system or subsystem, performing, by the content management system, an action based at least in part upon a multi-stage check that is performed on the content object or the collaboration event, wherein the document processing result arising out of the electronic signature system or subsystem indicates a first vulnerability or risk and pertains to acquiring the electronic-based signature on the electronic signature system or subsystem; and when the document processing result is determined to arise out of the content management system, determining and sending an instruction from the content management system to the electronic signature system or subsystem, wherein execution of the instruction on the electronic signature system or subsystem remediates the document processing result, and the document processing result arising out of the content management system indicates a second vulnerability or risk in acquiring the electronic-based signature on the electronic signature system or subsystem; and triggering the electronic-signature system or subsystem that carries out at least the instruction to securely acquire the electronic-based signature.

10. The non-transitory computer readable medium of claim 9, further comprising instructions which, when stored in memory and executed by the one or more processors causes the one or more processors to perform acts of remediating the first vulnerability or risk by causing the content management system to take an action based on the security vulnerability or risk, wherein
the action is determined based at least in part upon a bilateral information exchange in which the content management system and the electronic signature system or subsystem send derived information to one another, and
the bilateral information exchange comprising information pertaining to the first vulnerability or risk and information pertaining to the plurality of collaborators or the collaboration event.

11. The non-transitory computer readable medium of claim 9, further comprising instructions which, when stored in memory and executed by the one or more processors causes the one or more processors to perform acts, the acts further comprising:
performing the multi-stage check at least by:
in response to a determination that the content object is subject to an electronic signature processing at the electronic signature system or subsystem, performing, on the content management system, a security check on the content object.

12. The non-transitory computer readable medium of claim 9, further comprising instructions which, when stored in memory and executed by the one or more processors causes the one or more processors to perform the multi-stage check, performing the multi-stage check further comprising: in response to a completion of the security check, performing a content check, on the content management system, on the content object on the content management system.

13. The non-transitory computer readable medium of claim 9, wherein the second vulnerability or risk corresponds to a network path that involves a hop that is deemed to be a suspicious location, and the action taken by the content management system is to send the instruction to disallow an e-signature from taking place over that network path.

14. The non-transitory computer readable medium of claim 12, further comprising instructions which, when stored in memory and executed by the one or more processors causes the one or more processors to perform the multi-stage check, performing the multi-stage check further comprising in response to a completion of the content check, performing, on the content management system, an event check on the collaboration event.

15. The non-transitory computer readable medium of claim 14, further comprising instructions which, when stored in memory and executed by the one or more processors causes the one or more processors to perform acts, the acts comprising:
passing a finding of failure of the security check, the content check, or the event check to a remediation process; and remediating, by at least the remediation process, the first vulnerability or risk by causing the user device to take the action based at least in part on the first vulnerability or risk.

16. The non-transitory computer readable medium of claim 9, wherein the indication from the user device that the first vulnerability or risk has been detected by the user device corresponds to a network path change, the action taken by the content management system is to disallow acquisition of the electronic-based signature from taking place over the network path, and the non-transitory computer readable medium further comprises instructions which, when executed by the one or more processors, cause the one or more processor to perform at least one of a plurality of acts, the plurality of acts comprising:
downloading, from the content management system to the user device, an additional executable module that implements at least a call to the Internet-based interface;
remediating the first vulnerability or risk by causing the user device to take the action based at least in part on the security vulnerability or risk;
upon the indication that the security vulnerability or risk has been detected, then deferring acquisition of the electronic-based signature to a later time; or
performing document hardening by watermarking a subject content object with a visible identification corresponding to a user of the user device and advising the user device that a hardened document is available as a new subject document.

17. A system for securely acquiring and managing electronic-based signatures by a content management system, the system comprising:
a storage medium having stored thereon a sequence of instructions; and
one or more processors that execute the sequence of instructions, execution of the sequence of instructions causes the one or more processors to perform a set of acts, the set of acts comprising,
identifying an executable module from a content management system that hosts and exposes a content object to a plurality of collaborators for collaboration, wherein
the collaboration comprises collaboratively modifying the content object or metadata pertaining to the content object by at least some of the plurality of collaborators in a collaboration event hosted on the content management system, and
the executable module implements an Internet-based interface that is used to acquire an electronic-based signature for the content object, using a user device connected to an electronic signature system or subsystem;
determining a document processing result pertaining to a request from the user device to access the content object over the Internet-based interface;
when the document processing result is determined to arise out of the electronic signature system or subsystem,
performing, by the content management system, an action on the content object to remediate the document processing result based at least in part upon a multi-stage check that is performed on the content object or the collaboration event, wherein
the document processing result arising out of the electronic signature system or subsystem indicates a first vulnerability or risk and pertains to acquiring the electronic-based signature on the electronic signature system or subsystem; and when the document processing result is determined to arise out of the content management system, determining and sending an instruction from the content management system to the electronic signature system or subsystem, wherein execution of the instruction on the electronic signature system or subsystem remediates the document processing result, and the document processing result arising out of the content management system indicates a second vulnerability or risk in acquiring the electronic-based signature on the electronic signature system or subsystem; and triggering the electronic-signature system or subsystem that carries out at least the instruction to securely acquire the electronic-based signature.

18. The system of claim 17, the set of acts further comprising:

performing the multi-stage check at least by:

in response to a determination that the content object is subject to an electronic signature processing at the electronic signature system or subsystem, performing, on the content management system, a security check on the content object; and in response to a completion of the security check, performing, on the content management system, a content check on the content object.

19. The system of claim 17, performing the multi-stage check further comprising:

performing the multi-stage check further comprising in response to a completion of the content check, performing, on the content management system, an event check on the collaboration event; and passing a finding of failure of the security check, the content check, or the event check to a remediation process.

20. The system of claim 17, further comprising remediating, by at least the remediation process, the first vulnerability or risk by causing the user device to take the action based at least in part on the first vulnerability or risk and at least one of a plurality of acts, the plurality of acts comprising:

downloading, from the content management system to the user device, an additional executable module that implements at least a call to the Internet-based interface; or remediating the first vulnerability by causing the user device to take an action based on the security vulnerability.

* * * * *